(12) United States Patent  
Kumar et al.

(10) Patent No.: US 10,509,875 B2
(45) Date of Patent: Dec. 17, 2019

(54) ANALYSIS OF LAMINATE STRUCTURES

(71) Applicant: Wisconsin Alumni Research Foundation, Madison, WI (US)

(72) Inventors: Goldy Kumar, Madison, WI (US); Vadim Shapiro, Berkeley, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1318 days.

(21) Appl. No.: 14/511,915

(22) Filed: Oct. 10, 2014

(65) Prior Publication Data

US 2016/0103939 A1   Apr. 14, 2016

(51) Int. Cl.
   *G06F 17/50*   (2006.01)
(52) U.S. Cl.
   CPC ................. *G06F 17/5018* (2013.01)
(58) Field of Classification Search
   None
   See application file for complete search history.

(56) References Cited

U.S. PATENT DOCUMENTS

| | | | | |
|---|---|---|---|---|
| 5,968,625 A | * | 10/1999 | Hudson | B32B 21/13 428/106 |
| 2008/0192049 A1 | * | 8/2008 | Schiwietz | G06T 3/0093 345/420 |
| 2010/0299112 A1 | * | 11/2010 | Goldberg | G06F 17/5018 703/2 |

OTHER PUBLICATIONS

Cook, R.D. et al., Concepts and Applications of Finite Element Analysis, Wiley.com, 2007, pp. 88-89, 209-212.
Daniel, I. M. et al., Engineering Mechanics of Composite Materials, vol. 3, Oxford University Press New York, 1994, pp. 5-7; 37-57; 142-157.
Krommer, A. R., Numerical Integration: On Advanced Computer Systems, vol. 848, Springer, 1994, Chapter 4, pp. 67-68.
Matthews, F.L., Finite element modelling of composite materials and structures, CRC Press, 2000, pp. 23-37; 77-78; and 101-104.
Reddy, J. N., Mechanics of Laminated Composite Plates and Shells: Theory and Analysis/JN Reddy, CRC press, 2004, pp. 109-156; 548-554; and 671-696.

(Continued)

*Primary Examiner* — Craig C Dorais
(74) *Attorney, Agent, or Firm* — McDonnell Boehnen Hulbert & Berghoff LLP

(57) ABSTRACT

An example embodiment may involve obtaining a model of physical characteristics of a tangible composite laminate. The tangible composite laminate may include at least two plies, and the model may include representations of each respective ply. The example embodiment may also involve identifying a virtual material model of one or more plies of the tangible composite laminate. The virtual material model may be associated with characteristics that match the representations of the one or more plies of the tangible composite laminate. The example embodiment may further involve updating the model by replacing the representations, in the model, of the one or more plies of the tangible composite laminate with the virtual material model. The example embodiment may additionally involve conducting structural analysis of the updated model.

17 Claims, 18 Drawing Sheets

(56) References Cited

OTHER PUBLICATIONS

Zienkiewicz, O.C., The Finite Element Method for Solid and Structural Mechanics, Butterworth-Heinemann, 2005, pp. 323-421.

Asme, Asme Y14.37/2012 composite part drawings, 2012, pp. 1-5.

ANSYS Inc., ANSYS Theory Reference, Release 5.6, Eleventh Edition, A. U. Manual, Editor: Peter Kohnkke, Ph.D., Canonsburg, PA, pp. Table of Contents and pp. 14-485-14-487, 14-494-14-495.

Bathe, K.J. et al., "A Formulation of General Shell Elements the use of Mixed Interpolation of Tensorial Components," International Journal for Numerical Methods in Engineering, 1986, pp. 697-722, vol. 22, No. 3.

Carrera, E., "Theories and Finite Elements for Multilayered, Anisotropic, Composite Plates and Shells," Archives of Computational Methods in Engineering, 2002, pp. 87-140, vol. 9, No. 2.

Chatiri, M. et al., "An assessment of the new ls-dyna layered solid element: basics, patch simulation and its potential for thick composite structure analysis," 7th European LS-DYNA Conference, Salzburg, 2009, pp. 1-12.

Dorninger, K. et al., "A Layered Composite Shell Element for Elastic and Thermoelastic Stress and Stability Analysis at Large Deformations," International Journal for Numerical Methods in Engineering, 1990, pp. 833-858, vol. 30, No. 4.

Dow, J.O. et al., "The Identification and Elimination of Artificial Stiffening Errors in Finite Elements," International Journal for Numerical Methods in Engineering, 1988, pp. 743-762, vol. 26, No. 3.

Düster, A. et al., "The p-version of the finite element method for three-dimensional curved thin walled structures," International Journal for Numerical Methods in Engineering, 2001, pp. 673-703, vol. 52, No. 7.

Freytag, M. et al., "Finite element analysis in situ," Finite Elements in Analysis and Design, 2011, pp. 957-972, vol. 47, No. 9.

Hart-Smith, L.J., Adhesive-bonded single-lap joints, Langley Research Center Hampton, VA, Jan. 1973, pp. 1-116.

Henry, Scott D. et al., ASM Handbook, vol. 21. Materials Park, OH, USA: ASM International, 2001, pp. 1-4.

Hossain, S. et al., "A finite element formulation for the analysis of laminated composite shells," Computers & Structures, 2004, pp. 1623-1638, vol. 82, No. 20.

Idlbi, A. et al., "Comparison of various laminated plate theories," Composite Structures 1997, pp. 173-184, vol. 37, No. 2.

Kant, T. et al., "Estimation of transverse/interlaminar stresses in laminated composites—a selective review and survey of current developments," Composite Structures, 2000, pp. 65-75, vol. 49, No. 1.

Klinkel, S. et al., "A continuum based three-dimensional shell element for laminated structures," Computers & Structures, 1999, pp. 43-62, vol. 71, No. 1.

Kumar, G. et al., "Analysis of Multi-Material Bonded Assemblies on a Non-Conforming Mesh," Proceedings of the ASME 2012 International Design Engineering Technical Conferences and Computers and Information in Engineering Conference, American Society of Mechanical Engineers, Aug. 12-15, 2012, Chicago, IL, pp. 111-123.

Sun, C. et al., "Three-Dimensional Effective Elastic Constants for Thick Laminates," Journal of Composite Materials, 1988, pp. 629-639, vol. 22, No. 7.

Suresh, Krishnan, Dr., "Automating the CAD/CAE Dimensional Reduction Process," Proceedings of the Eighth ACM Symposium on Solid Modeling and Applications, ACM, 2003, pp. 76-85.

Suri, Manil, "Analytical and computational assessment of locking in the hp finite element method," Computer Methods in Applied Mechanics and Engineering, 1996, pp. 347-371, vol. 133, No. 3.

Zhang, Y.X. et al., "Recent developments in finite element analysis for laminated composite plates," Composite Structures, 2009, pp. 147-157, vol. 88, No. 1.

Laminates, pp. 1-20 retrieved on Aug. 22, 2014 from this URL: www.mate.tue.nl/ . . . /pdf/linlam.pdf.

Wikipedia, Composite Laminates, accessed Aug. 22, 2014 from https://en.wikipedia.org/wiki/Composite_laminates, 3 pages.

Wikipedia, Lamination, accessed Aug. 22, 2014 from https://en.wikipedia.org/wiki/Lamination, 3 pages.

* cited by examiner (A)　　　(B)

ANALYSIS OF LAMINATE STRUCTURES

GOVERNMENT LICENSE RIGHTS

This invention was made with government support under 1344205 and 1029553 awarded by the National Science Foundation. The government has certain rights in the invention.

BACKGROUND

Laminate composites are widely used in automotive, aerospace, medical, and consumer industries, due to their reduced weight and superior structural properties compared to homogenous materials. However, structural analysis, typically aided by Finite Element Analysis (FEA), of complex laminates remains challenging. Two dimensional (2D) finite element methods based on plate and shell theories may be accurate and efficient, but they generally do not apply to the whole structure and require identification and preprocessing of the regions where the underlying assumptions hold. Fully automated structural analysis using solid three-dimensional (3D) elements is possible in principle, but is rarely practiced due to the significant increase in the cost of computational integration over a large number of laminate plies.

SUMMARY

The choice between 2D and 3D FEA of laminates amounts to a trade-off between generality and computational efficiency. In the embodiments herein, some or all of the original laminate may be replaced by simpler new virtual material models. These virtual material models have the same constitutive relationship as the corresponding model (e.g., a 2D plate model) of the original laminate, but use only a small fraction of the computational costs of 3D FEA. In this way, the structural analysis can obtain an accuracy approaching that of 3D FEA, but with a computational cost closer to that of 2D FEA.

A first example embodiment may involve obtaining a model of physical characteristics of a tangible composite laminate. The tangible composite laminate may include at least two plies, and the model may include representations of each respective ply. The first example embodiment may also involve identifying a virtual material model of one or more plies of the tangible composite laminate. The virtual material model may be associated with characteristics that match the representations of the one or more plies of the tangible composite laminate. The first example embodiment may further involve updating the model by replacing, in the model, the representations of the one or more plies of the tangible composite laminate with the virtual material model. The first example embodiment may additionally involve conducting structural analysis of the updated model.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, data storage, and program instructions. The program instructions may be stored in the data storage, and upon execution by the at least one processor, may cause the computing device to perform operations in accordance with the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example operations, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Lamination includes various techniques of manufacturing materials in multiple layers, or "plies." The plies may be joined with one another using some form of adhesive or another bonding agent. At least some plies may be made of differing materials, resulting in a composite, or hybrid, laminate. Such a composite material may exhibit improved strength, stability, sound insulation, appearance, and/or other properties that are superior to a monolithic material. As a simple example, corrugated fiberboard boxes are examples of laminates where an inner core provides rigidity and strength, while outer plies provide a smooth surface.

A laminate may be designed for a particular purpose. Thus, the combination of plies may be selected to emphasize one or more specific characteristics. Specialized laminates are commonly used in the automotive, aerospace, medical, and consumer industries.

Figure 1:
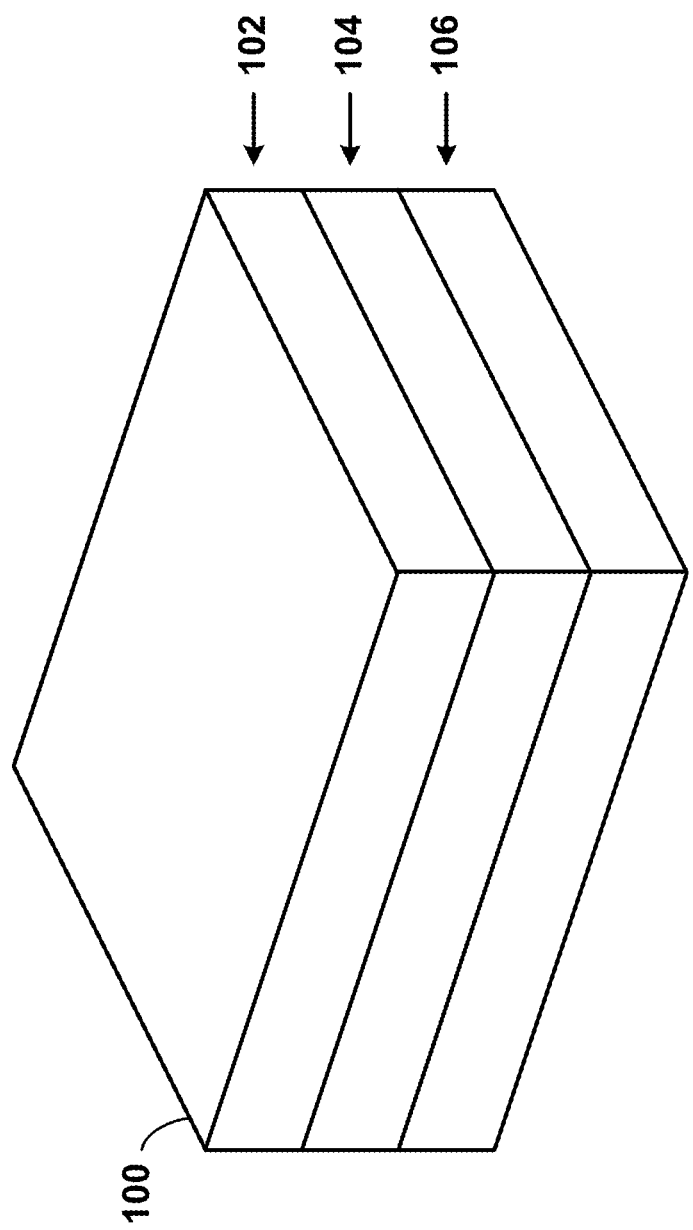
FIG. 1 depicts a 3-ply laminate, according to an example embodiment.

An angular cross-section of an example laminate 100 is shown in FIG. 1. Laminate 100 includes three plies, ply 102 on the top, ply 104 in the middle, and ply 106 on the bottom. Each of these plies may be fabricated from differing materials, or the same material may be used for more than one ply. For instance, ply 102 and ply 106 may be of the same material, while ply 104 may be of a different material.

The individual plies may be orthotropic (with mechanical properties that are different along each orthogonal axis) or transversely isotropic (with uniform mechanical properties in the transverse plane). The laminate as a whole may exhibit orthotropic, anisotropic (with mechanical properties that vary in any direction), or quasi-isotropic properties (with isotropic properties in a plane, but are not restricted to isotropic out-of-plane (e.g., bending) properties). Other possibilities exist.

A high stiffness-to-weight ratio may be achieved in some laminates by using fiber-reinforced plies. These plies, when fused together under high temperature and pressure, form complex monolithic laminate parts. The fiber reinforcements, laid using techniques ranging from manual to fully automatic, are generally parallel and unidirectional and, therefore, result in plies which are anisotropic in nature. Material properties are customized by varying fiber angle within each ply, the number of plies, and adding additional materials between plies such as cores and fillers.

However, the presence of numerous materials leads to complex geometry and material distribution in laminate structures, which, together with discrete change of material properties at ply interfaces, result in laminates that are difficult to analyze. For example, complex deformation and stress-strain fields, among other challenges, may exist.

Structural analysis of laminates can be carried out using different finite element methods that model a structural system as a set of finite elements (e.g., 2D or 3D shapes) interconnected at nodes. Sometimes, the set of elements are referred to as a mesh. During FEA, a stiffness matrix $K_e$ for each element e may be calculated using the formula:

$$K_e = \int_{\Omega_e} B^T \cdot Q \cdot B \, d\Omega$$

where B is the strain-displacement matrix, Q is the material constitutive relation matrix, and $\Omega_e$ is the element's domain over which integration is done. The strain-displacement matrix may represent nodal displacements in the elements as strains (where strain is the ratio of deformation over initial length of an object). The material constitutive relation matrix may represent effective strains in the elements as stresses (where stress is the force per unit area on an object). $K_e$ may represent, for instance, the geometric and material behavior information that indicates the resistance of the element to deformation when subjected to loading.

Since there may be numerous plies in a particular laminate (e.g., dozens or hundreds), determining $K_e$ for each ply independently may result a large number of elements (each element using an integration) and is, therefore, computationally expensive. A much smaller number of elements may be used if elements can cross through multiple plies. Regardless, for many real-world, meaningful examples of laminates, determining $K_e$ for the laminate is intractable (too complex and requiring too much time) even for computer implementation, while manual calculations are impractical to the point of being impossible.

For instance, integration may be performed using quadrature rules that depend on the geometry of the element as well as the degree of the integrand, and amounts to sampling the integrand at a number of quadrature points. Such a quadrature rule may approximate the definite integral of a function as a weighted sum of values of the function at specific points within the domain of integration.

To understand the high cost of integration for laminates, suppose an example element used is made of 100 plies. The element used is an eight-node brick element with tri-linear basis functions, which, for a homogeneous material, is fully integrated using 2 integration points in each direction, or 8 integration points in total. However, in a laminate, 8 integration points are used for each ply, which results in a 100-fold increase for the 100-ply laminate. Since integration cost represents a significant portion of the overall solution procedure, analysis of composite laminates using FEA is a computationally expensive proposition.

Plate or shell assumptions are often used to reduce the computation cost and increase accuracy of FEA for thin laminates (but other assumptions are also possible). Under these assumptions, each ply is viewed as a 2D plate or 3D shell, and the laminate is viewed as a stacking or other arrangement of these plates or shells. These assumptions may lead to different lamination theories, where the material matrices Q of all the plies are replaced by so-called ABD matrices (which will be explained in later sections). The structure and the integration domain effectively reduce to that a surface, which is why this method is also called 2D FEA. However, strictly speaking, 2D FEA is not valid in regions where plate/shell assumptions do not apply, which include regions near the edges, joints, and laminate transitions. In this sense, 2D FEA methods are not general, because such regions are common in laminate structures, and require special treatment when using 2D FEA methods.

The embodiments herein may also incorporate lamination theories that do not require modeling plies as a 2D plate or 3D shell.

Thus, the choice between 2D and 3D FEA amounts to a trade-off between generality and computational efficiency. The embodiments herein provide for analysis of composite laminate structures that is as general as 3D FEA and as efficient as 2D FEA when dimensional reduction makes sense. Specifically, the excessive cost of integration for elements is reduced by taking advantage of the plate/shell nature of laminates. To this end, the embodiments here use a procedure to obtain material models which are simpler, but equivalent to, the original laminate, under assumptions made in lamination theories. These new material models are referred to as ABD-equivalent material models, as they result in the same ABD matrices as the original laminate and, therefore, can replace the original laminate during integration if plate/shell assumptions apply.

The effectiveness of two such material models, a 3-ply and a graded material model is demonstrated in a non-conforming FEA system using solid elements (e.g., solid elements including one or more layers and with second-degree B-spline basis functions that are hierarchical in nature). These ABD-equivalent material models are validated by using them to analyze several benchmark problems, and compare obtained results from known results.

In order to illustrate the computer hardware arrangements that might facilitate these features, the next section describes an example computing device and an example networked server cluster.

2. Example Computing Devices, Servers, and Systems

Figure 2:
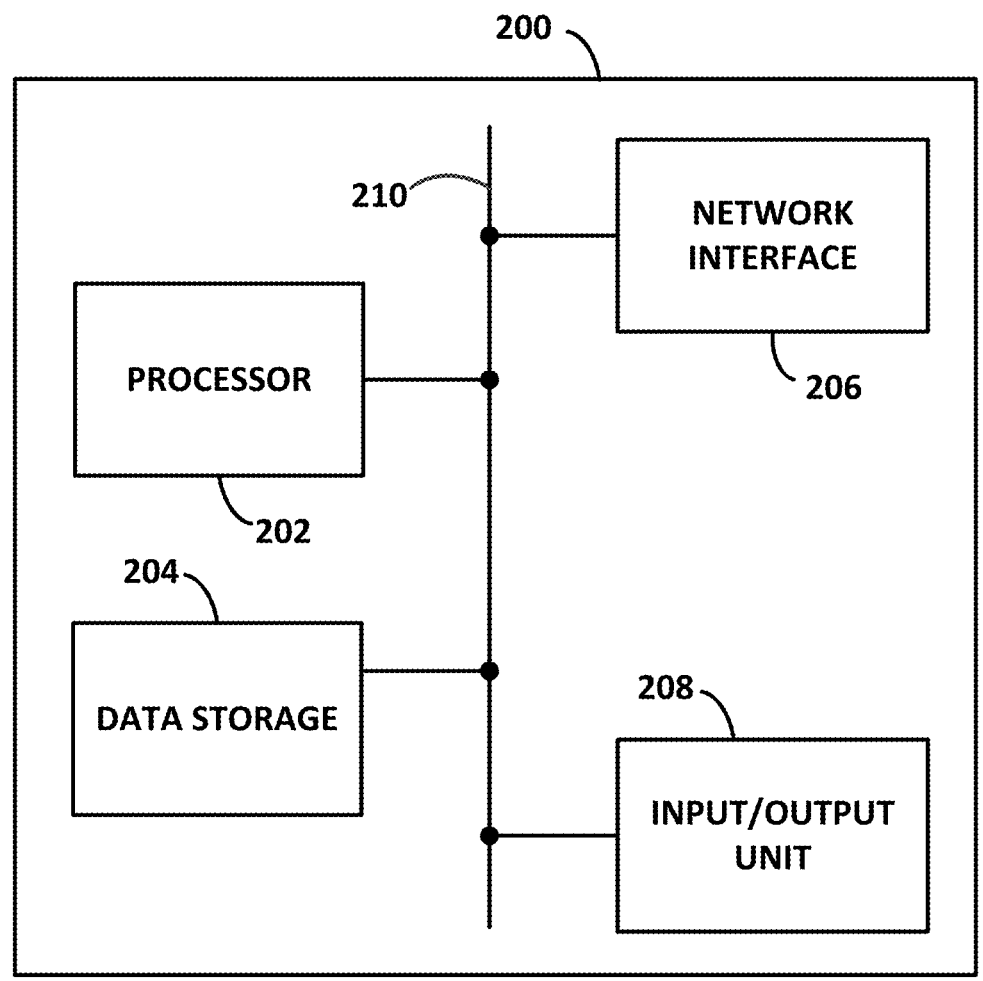
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a personal computer (PC), laptop, server, or some other type of computational platform. For purposes of simplicity, this specification may equate computing device 200 to a server device or client device from time to time, and may also refer to some or all of the components of computing device 200 as a "processing unit." Nonetheless, it should be understood that the description of computing device 200 could apply to any component used for the purposes described herein.

In this example, computing device 200 includes a processor 202, a data storage 204, a network interface 206, and an input/output unit 208, all of which may be coupled by a system bus 210 or a similar mechanism. Processor 202 can include one or more CPUs, such as one or more general purpose processors and/or one or more dedicated processors (e.g., application specific integrated circuits, digital signal processors, network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or operations disclosed in this specification or the accompanying drawings.

Network interface 206 may take the form of a wireline connection, such as an Ethernet connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output unit 208 may facilitate user interaction with example computing device 200. Input/output unit 208 may comprise multiple types of input devices, such as a keyboard, a mouse, a touch screen, and so on. Similarly, input/output unit 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
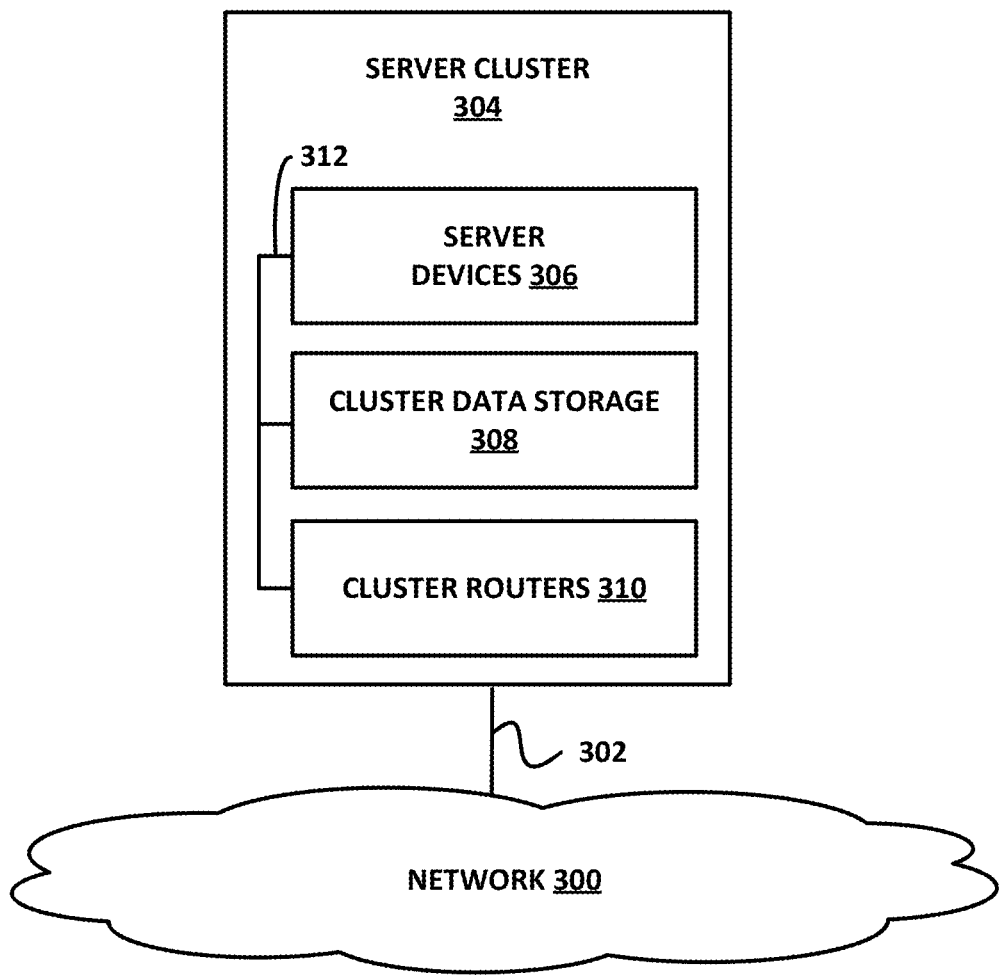
FIG. 3 illustrates a schematic drawing of a networked server cluster, according to an example embodiment.

FIG. 3 depicts a cloud-based server cluster 304 in accordance with an example embodiment. In FIG. 3, operations of computing device 200 may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

3. Example Lamination Theories

As noted above, laminates usually behave as plates or shells, and are analyzed using 2D FEA. Depending on the strain field assumed in the laminate's thickness direction, different lamination theories exist, and can be classified as one of the following: Classical Lamination Plate Theory (CLPT), First Order Shear Deformation Theory (FSDT), or Higher Order Shear Deformation Theories (HSDTs).

CLPT assumes laminates undergo only stretching and pure bending. Thus, in-plane strains vary linearly in the thickness direction, and out-of-plane strains are absent. On the other hand, FSTD and HSDT, as the names suggest, assume non-zero out-of-plane shear strains; FSDT assumes constant while HSDTs assume linear or even higher order variation. In-plane strains are assumed to be identical to CLPT, and out-of-plane normal strain is absent.

Figure 4:
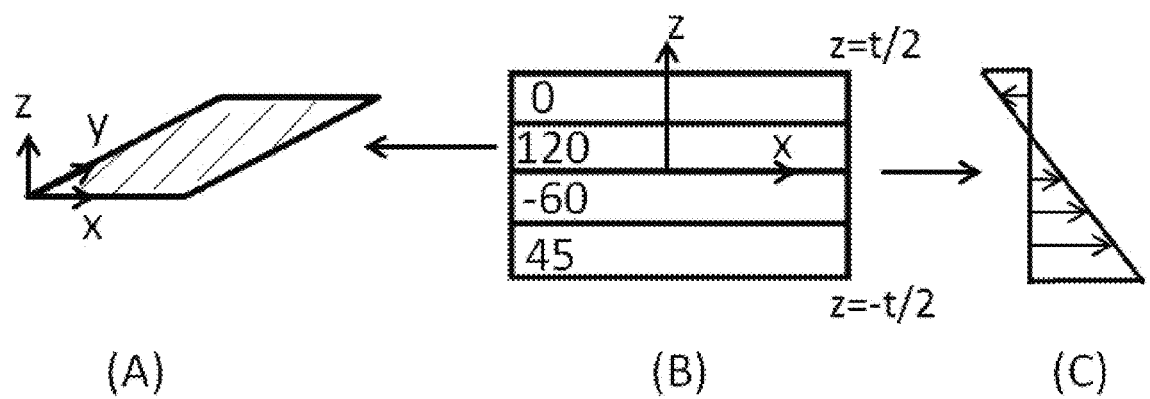
FIG. 4 illustrates a laminate, according to example embodiments.

For instance, FIG. 4 illustrates a laminate and the variation of strain field in the x direction along the thickness obtained using CLPT. Particularly, FIG. 4 part A depicts a ply of a laminate with a fiber angle of 120 degrees. FIG. 4 part B shows an xz cross section of a laminate with plies at angles of 45, −60, 120, and 0 degrees. FIG. 4 part C illustrates the linear variation of strain along the z-axis while the laminate is in stretching and pure bending.

As discussed above, although 2D FEA is efficient, it is not general. In addition, 2D FEA suffers from additional drawbacks that limit its applicability in analyzing a complex laminate structure. First, it assumes the structure to be dimensionally reduced to a surface, which could be a complex task in itself. Even if the structure is successfully reduced, modeling an assembly of multiple plates and shells can be problematic. Also, 2D FEA uses different theories for thick and thin plates. In addition, due to dimensional reduction, 2D FEA can sometimes completely miss a 3D phenomenon.

Figure 5:
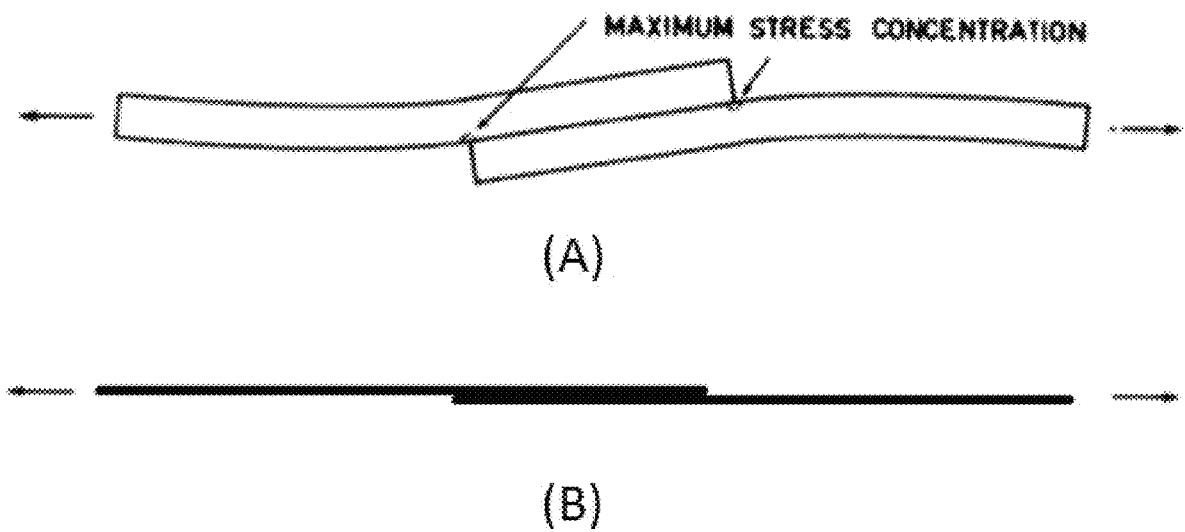
FIG. 5 illustrates a lap joint, according to example embodiments.

For example, in the lap joint problem shown in FIG. 5, 2D FEA misses the moments due to eccentric forces when the lap joint is reduced to a surface. FIG. 5 part A illustrates a lap joint bending under in-plane loading, which leads to high stress concentration near the joint. However, as depicted in FIG. 5 part B, when analyzed as a 2D structure, bending in lap joint might not be captured at all. In theory, 3D FEA using layered elements will accurately simulate deformation in laminate structures. In practice, however, using solid elements is expensive.

It is possible to develop hybrid methods that incorporate 2D plate and shell behaviors in 3D FEA. For example, solid-shell elements are 3D elements that use the Assumed Natural Strain method to deform like plates and shells. Their three dimensional nature is well suited for interfacing with other solid elements in assemblies. These elements, however, still require mid-surface extraction and also cannot simulate behaviors other than plate and shell behaviors.

Continuum solid-shell elements, unlike solid-shell elements, are standard displacement-based elements, but use advanced finite element techniques like the Assumed Strain Method and the Enhanced Strain Method to improve their performance for thin structures. The higher number of assumed and enhanced parameters, the better is the element's performance, but at the expense of generality. Although these elements do not require mid-surfaces explicitly, they must conform to the geometry of the laminate, with their z direction aligned to the transversal direction of structure's offset thickness, because the in-plane and out-of-plane behaviors are assumed or enhanced differently. Such elements may be referred to as conforming layered elements, and an example is illustrated in FIG. 1. These elements are still expensive for FEA of laminates.

Aligning an element's z direction to the laminate's transversal thickness direction also simplifies volume integration. If not aligned, plies can intersect elements at arbitrary angles and require computation of intersections between individual plies and elements, which is both non-trivial and computationally expensive. For this reason, 3D FEA of laminates using a non-conforming mesh becomes less attractive, despite its advantages over using a conforming mesh.

4. Example Material Models for Composite Laminates

This section summarizes the classical theories used to establish the constitutive relationships in a laminate, and to derive ABD-equivalent material models which remain valid under identical assumptions.

A. Constitutive Relations for Orthotropic Plies

In linear elasticity, stiffness matrix C is used to characterize a material. Since plies are orthotropic in nature, the corresponding matrix C uses 9 independent elastic constants. The constitutive relation between stress and strain takes a general form given by $$\sigma_i = C_{ij} \cdot \epsilon_j, i,j=1,2,\ldots,6$$

where $\sigma$ is stress and $\epsilon$ is strain. The equation is in contracted notation where i,j=1, 2, 3 are the x, y, z coordinate axes, respectively, while i,j=4, 5, 6 are the yz, zx, xy planes, respectively. Unlike isotropic materials, C is direction dependent for orthotropic materials and may be transformed from its principal material directions to element's coordinate directions.

The plane-stress constitutive relationship for dimensionally reduced laminates is characterized by a 3×3 stiffness matrix Q and is given as $$\sigma_i = Q_{ij} \cdot \epsilon_j, i,j=1,2,3$$

where i,j=1, 2 represent the x and y axes, respectively, and i,j=3 represents the xy plane.

In thick plates, out-of-plane shear strains $\epsilon_{yz}$ and $\epsilon_{yx}$ are significant, and therefore, out-of-plane shear stiffness, in addition to in-plane stiffness, are needed to characterize a ply. In an arbitrary coordinate system, shear stresses $\sigma_{yz}$ and $\sigma_{xz}$ are related to shear strains $\epsilon_{yz}$ and $\epsilon_{yx}$ as $$\begin{bmatrix} \sigma_4 \\ \sigma_5 \end{bmatrix} = \begin{bmatrix} Q_{44} & Q_{45} \\ Q_{45} & Q_{55} \end{bmatrix} \cdot \begin{bmatrix} \epsilon_4 \\ \epsilon_5 \end{bmatrix}$$

where the indices 4 and 5 represent the planes yz and xz respectively.

It is assumed that the z direction is the thickness direction for both the laminate and its plies, which is also the third principal direction of the orthotropic layered materials. Plate theory assumes that the thickness of a plate in stretching and pure bending remains constant, or in other words, Poisson's ratios (which measure the negative ratio of transverse to axial strain) for $v_{xz}$ and $v_{yz}$ are zero. These assumptions reduce the general stress-strain relation to $$\begin{bmatrix} \sigma_x \\ \sigma_y \\ \tau_{xy} \\ \tau_{yz} \\ \tau_{xz} \\ \sigma_z \end{bmatrix} = \begin{bmatrix} Q_{11} & Q_{12} & Q_{13} & 0 & 0 & 0 \\ Q_{12} & Q_{22} & Q_{23} & 0 & 0 & 0 \\ Q_{13} & Q_{23} & Q_{33} & 0 & 0 & 0 \\ 0 & 0 & 0 & Q_{44} & Q_{45} & 0 \\ 0 & 0 & 0 & Q_{45} & Q_{55} & 0 \\ 0 & 0 & 0 & 0 & 0 & E_3 \end{bmatrix} \cdot \begin{bmatrix} \epsilon_x \\ \epsilon_y \\ \gamma_{xy} \\ \gamma_{yz} \\ \gamma_{xz} \\ \epsilon_z \end{bmatrix}$$

where the indices $C_{ij}$ are reordered to match those of $Q_{ij}$. Also, $C_{33}$ reduces to $E_3$, the Young's Modulus, in the third principal material direction. Young's Modulus is a measure of the stiffness of an elastic material, and is defined as the ratio of the stress along an axis over the strain along the axis in locations that Hooke's Law holds. Hooke's Law, in turn, is the principle that the force needed to extend or compress an elastic body a particular distance is directly proportional to that distance.

B. Constitutive Model for Laminates, or Lamination Theories

Classical lamination plate theory (CLPT) assumes that laminates can only undergo stretching and pure bending. Therefore, strain $\epsilon_i$ at any point in the laminate can be related linearly to strain $\epsilon_i^o$ and curvature $\kappa_i$ at the mid-plane, and is given as $$\epsilon_i = \epsilon_i^o + z \cdot \kappa_i, i = 1,2,3$$

where z is the distance of the point from the mid-plane. FIG. 4 part C shows the plot of $\epsilon_i$ at a typical cross section of a laminate.

Since the amounts of stretching and bending in a plate depend only on the net forces and moments, the stresses in the laminate's cross-section can be reduced to just mid-plane forces $N_i$ and moments $M_i$. This is done by integrating stresses $\sigma_i$ over the thickness of the laminate from $-t/2$ (the bottom of the laminate) to $t/2$ (the top of the laminate) and is given as $$N_i = \int_{-t/2}^{t/2} \sigma_i dz$$

and $$M_i = \int_{-t/2}^{t/2} \sigma_i z dz$$

Combining this equation with plane-stress constitutive relationship for $\sigma_i$ and the strain field $\epsilon_i$ leads to the ABD matrix model for laminates:

$$\begin{bmatrix} N \\ M \end{bmatrix} = \begin{bmatrix} A & B \\ B & D \end{bmatrix} \cdot \begin{bmatrix} \epsilon^o \\ \kappa \end{bmatrix}$$

The individual coefficients of the matrices A, B, and D for indices i=1, 2, 3 are $$A_{ij} = \int_{-t/2}^{t/2} Q_{ij} dz$$

$$B_{ij} = \int_{-t/2}^{t/2} Q_{ij} z dz$$

$$D_{ij} = \int_{-t/2}^{t/2} Q_{ij} z^2 dz$$

Matrices A and D are extensional and bending components of the stiffness respectively, while matrix B couples stiffness between bending and stretching that occurs in a laminate if its material properties are asymmetrical about its mid-plane. If B is a non-zero matrix, a normal pull in x or y direction can lead to bending and vice versa.

The out-of-plane shear stresses can also be reduced to mid-plane shear forces $\Gamma_4$ and $\Gamma_5$ using a procedure very similar to the one used to reduce the in-plane stresses to mid-plane forces $N_i$, leading to $$\begin{bmatrix} \Gamma_4 \\ \Gamma_5 \end{bmatrix} = K \cdot \begin{bmatrix} A_{44} & A_{45} \\ A_{45} & A_{55} \end{bmatrix} \cdot \begin{bmatrix} \epsilon_4 \\ \epsilon_5 \end{bmatrix}$$

Here, strains $\epsilon_4$ and $\epsilon_5$ are assumed constant in the z direction, and any deviation from the actual field is corrected using a correction factor K. The extensional shear stiffness coefficients $A_{44}$, $A_{45}$, and $A_{55}$ are defined as $A_{ij}$.

C. ABD-Equivalent Material Models of Laminates

Under the assumption that ABD matrices are an accurate approximation of a laminate's behavior and/or characteristics, it stands to reason that any two material models that result in identical ABD matrices should be deemed equivalent. In fact, when multiple material models with identical ABD matrices exist, these material models form an equivalence class of material models. From this class, the simpler or simplest models can be determined, and these models can be used to replace the original laminate in the 3D integration procedure in FEA.

Figure 6:
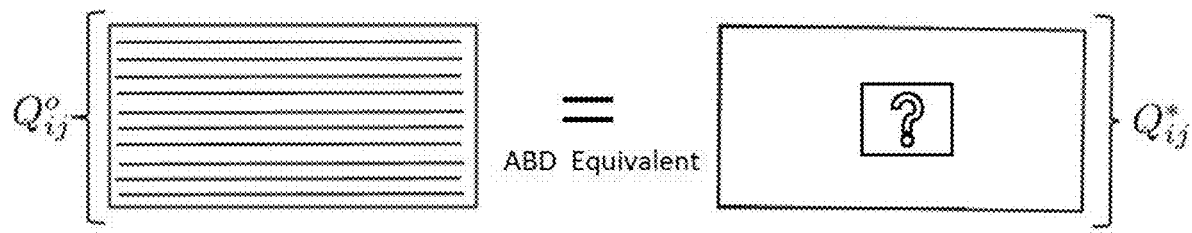
FIG. 6 illustrates replacing at least some plies of an original laminate with a virtual material model, according to an example embodiment.

This process is exemplified in FIG. 6. An original laminate with material properties $Q_{ij}^o$ can be replaced by a new material model $Q_{ij}^*$ that is ABD equivalent to $Q_{ij}^o$.

$$A_{ij}^o = \int_{-t/2}^{t/2} Q_{ij}^o dz = \int_{-t/2}^{t/2} Q_{ij}^* dz$$

$$B_{ij}^o = \int_{-t/2}^{t/2} Q_{ij}^o z dz = \int_{-t/2}^{t/2} Q_{ij}^* z dz$$

$$D_{ij}^o = \int_{-t/2}^{t/2} Q_{ij}^o Q_{ij}^o z^2 dz = \int_{-t/2}^{t/2} Q_{ij}^* z^2 dz$$

where the original laminate $Q_{ij}^o$ defines the matrices $A_{ij}^o$, $B_{ij}^o$, and $D_{ij}^o$, and the new material model $Q_{ij}^*$ results in the same ABD matrices.

Since the above integral equations are a system of three equations for each entry of ABD matrices, they can be completely determined by a material model $Q_{ij}^*$ that varies in the thickness direction, and the variation is fully specified by 3 or more independent coefficients. There are infinitely many such models, and any two of them are interchangeable if the assumptions made in lamination theory hold. In other words, for the purpose of FEA, any arbitrarily complex laminate with numerous plies can be replaced by a much simpler material model yielding identical results. Furthermore, since the new material model is virtual, it might not be subject to manufacturing constraints, and doesn't have to be ply-based. Nonetheless, it may be desirable to be able to manufacture a material represented by a virtual material model, perhaps via 3D printing. Alternatively, the virtual material model may represent a new composite that is less expensive to manufacture. Thus, these "virtual material models" may serve as surrogates or proxies for actual materials or composites that are known or may be determined in the future.

For purposes of illustration, two such virtual material models, a 3-ply laminate and a quadratically graded material, are considered. The in-plane material properties of the two ABD-equivalent models respectively may be derived, as well as the out-of-plane material properties that may be common for both the models.

Nonetheless, other virtual material models may be used. In general, any procedure that uses an n-parameter model of laminate characteristics and solves a corresponding n×n system of linear equations may be used as at least part of a virtual material model.

D. The 3-Ply Laminate Model

Figure 7:
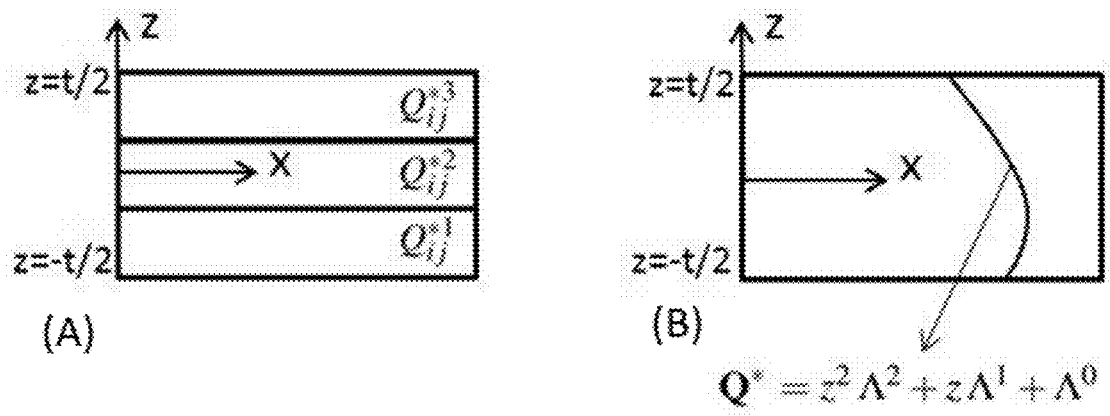
FIG. 7 illustrates ABD-equivalent material models, according to example embodiments.

In the equivalence class of material models with given ABD matrices, a 3-ply material model is a simple ply-based model. FIG. 7 part A shows a 3-ply material model with $Q_{ij}^{*k}$ representing the material properties of the kth ply. For purposes of simplicity, each ply is assumed to be of equal thickness. With these assumptions, $Q_{ij}^{*k}$ can be solved in terms of the ABD matrices of the physical laminate as $$Q_{ij}^{*1} = \frac{36D_{ij}^o - 18tB_{ij}^o - t^2 A_{ij}^o}{8t^3}$$

$$Q_{ij}^{*2} = \frac{13t^2 A_{ij}^o - 36D_{ij}^o}{4t^3}$$

$$Q_{ij}^{*3} = \frac{36D_{ij}^o + 18tB_{ij}^o - t^2 A_{ij}^o}{8t^3}$$

where t is the laminate's total thickness and indices i,j=1, 2, 3.

There always exists at least one unique 3-ply laminate that is ABD-equivalent to the original laminate. Note that only the top and bottom plies depend on the B matrix, and the difference between these plies captures any material asymmetry about the mid-plane. If the original laminate is symmetrical, the B matrix is zero and the plies $Q_{ij}^{*1}$ and $Q_{ij}^{*3}$ are identical.

E. Quadratically Graded Anisotropic Material

Instead of a ply-based model, the original laminate can also be replaced by a continuously varying, or graded, material. Since there are three equations to be satisfied, a quadratic variation with 3 independent coefficients $\Lambda_{ij}^k$ with k=0, 1, 2 is sufficient. An example quadratically varying material model is shown in FIG. 7 part B and is given as $$Q_{ij}^* = z^2 \Lambda_{ij}^2 + z\Lambda_{ij}^1 + \Lambda_{ij}^0$$

$\Lambda_{ij}^k$ can be expressed in terms of the ABD matrices of the physical laminate as $$\Lambda_{ij}^0 = \frac{15(12D_{ij}^o - tA_{ij}^o)}{t^5}$$

$$\Lambda_{ij}^1 = \frac{12B_{ij}^o}{t^3}$$

$$\Lambda_{ij}^2 = \frac{3(3tA_{ij}^o - 20D_{ij}^o)}{4t^3}$$

The coefficients $\Lambda_{ij}^k$ represent various characteristics of the material model. For instance, the quadratic coefficient $\Lambda_{ij}^2$ and the constant coefficient $\Lambda_{ij}^0$ represent the bending and in-phase stiffness of the material model, while the linear coefficient $\Lambda_{ij}^1$ represents the coupling stiffness of the given laminate. There is at least one unique quadratically varying graded material for a given ABD matrix.

F. Transverse Material Properties of the ABD-Equivalent Material Models

In addition to in-plane material properties, out-of-plane material properties may be used to characterize the ABD-equivalent models. These out-of-plane, or transverse, material properties can be derived using approaches similar to above, and are common for both types of ABD-equivalent models.

From the equations that define $A_{ij}$, $B_{ij}$, and $D_{ij}$, the transverse shear properties of a laminate are can be found from the extensional stiffness matrix $A_{ij}$ for i,j=4, 5. Since the focus of the analysis is on equivalent material behavior, transverse shear stiffness $Q_{ij}^{*k}$ can be assumed constant along the laminate's thickness. Thus, $Q_{ij}^*$ can be obtained as the average values of $A_{ij}^o$ over the laminate's thickness for i,j=4, 5:

$$Q_{ij}^* = \frac{A_{ij}^o}{t}$$

The transverse normal stiffness of laminates, which might not be required for 2D FEA, can be used with the ABD-equivalent models. For instance, as noted above, the transverse normal stiffness for plate structures reduces to Young's Modulus $E_3$. For thin plied structures, the resultant out-of-plane Young's Modulus $E_3^o$ can be approximated as the harmonic mean of Young's Modulus for the individual plies of the original laminate, $E_3^{ok}$. To determine the equivalent material behavior of ABD-equivalent models, their Young's Modulus $E_3^*$ can be assumed to be constant throughout the laminate thickness. This assumption makes $E_3^*$ equivalent to $E_3^o$. Therefore $$\frac{1}{E_3^*} = \frac{1}{E_3^o} = \sum_{k=1}^{n} \frac{h^k}{E_3^{ok}}$$

where $h^k$ is the thickness of the kth ply, and n is the total number of plies in the original laminate.

In this way, various virtual material models that are ABD-equivalent to the original laminate can be efficiently constructed. If the usual lamination theory assumptions hold for the original laminate, these virtual material models may result in identical stiffness matrices during any FEA procedure. Thus, any one of these models can be used during analysis. However, some models could be easier to implement than others in a particular system or software package. For example, the 3-ply laminate model is straightforward to implement in systems that already support representation of laminates. On the other hand, the graded material model can be used to analyze laminates in systems that are meant for graded materials, but do not support laminates.

In general, virtual material models may be chosen using at least some of the following steps. First, a theory of lamination (beam, rod, plate, shell, membrane, etc.) which corresponds to known or desired behavior is chosen. The purpose of a theory is to simplify the general 3D behavior in terms of simplified constitutive relations (such as an ABD matrix). Second, the minimum number of parameters required to represent the simplified behavior is determined. For instance, in the examples above, three parameters were used. Third, a virtual material model is constructed with this minimum number of parameters.

5. Example Implementation

Laminates, as proposed by the current and emerging standards, are commonly represented as a base surface and an associated layup table with an entry for each ply. Base surfaces are generally the tooling surfaces on which plies are laid, and the table specifies the order, materials, and fiber directions of the individual plies.

In systems supporting laminates based on the above standard, implementing the 3-ply model is straightforward. The original layup table (or possibly a subset thereof) with any number of entries is replaced by a new table with at least three entries for the plies of the 3-ply model. For implementing the graded material model, instead of a table for the plies, coefficients $\Lambda_{ij}$ defining the quadratically graded material can be found.

ABD-equivalent models can be implemented in a meshfree system, e.g., a software package supporting meshfree analysis. The meshfree system, for instance, may approximate displacements and stresses using multi-variate B-spline functions that are constructed over a uniform Cartesian grid.

Figure 8:
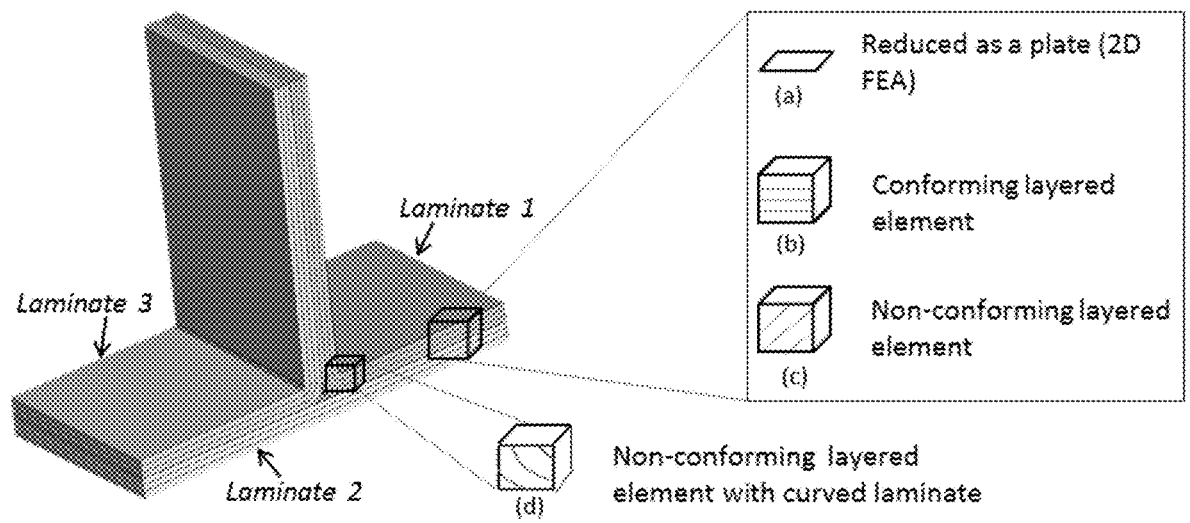
FIG. 8 illustrates conforming and non-conforming meshes for FEA of a laminate, according to example embodiments.

During FEA, the ABD-equivalent material models may be used while computing element stiffness matrices, $K_e$. If the mesh is conforming and the element's z axis is aligned to the laminate's thickness direction, an individual ply's exact location can be completely determined by its position in the z direction (see, e.g., items (a) and (b) in FIG. 8). Thus, in this case, computing volume integration for the 3-ply model is straightforward.

Figure 9:
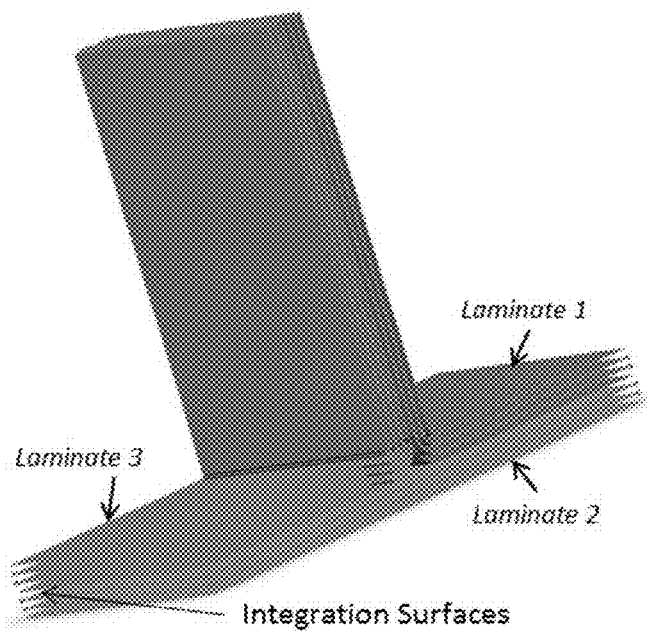
FIG. 9 illustrates replacing plies of a laminate by a set of surfaces parallel to the tooling surface of the laminate, according to an example embodiment.

However volume integration is more involved for a non-conforming mesh. Plies can intersect a grid element at arbitrary angles (see, e.g., items (c) and (d) in FIG. 8). Also, in structures made of multiple laminates, more than one laminate can intersect an element. As a result, computing the intersection of each ply with an element can be both complicated as well as expensive. Therefore, for an ease of implementation, volume integration can be approximated by integration over surfaces. Particularly, each laminate can be replaced by a set of surfaces parallel to the tooling surface, as shown in FIG. 9. These surfaces, referred to as integration surfaces, can be generated as tooling surface's offsets. The location of integration surfaces in the laminate's thickness direction can be obtained using various quadrature rules, such as the Lobatto quadrature rules.

In addition to simplifying volume integration, this integration scheme also makes implementation of the ABD-equivalent graded model much less complex. Particularly, since an integration surface is an offset at a constant distance from the laminate's mid-plane, coefficients $\Lambda_{ij}$ of the graded material are also constant within that integration surface. Therefore, the coefficients may be computed only once. Integration over each surface can be performed by first triangulating it, and then integrating the obtained triangles using Gauss quadrature rules.

Figure 10:
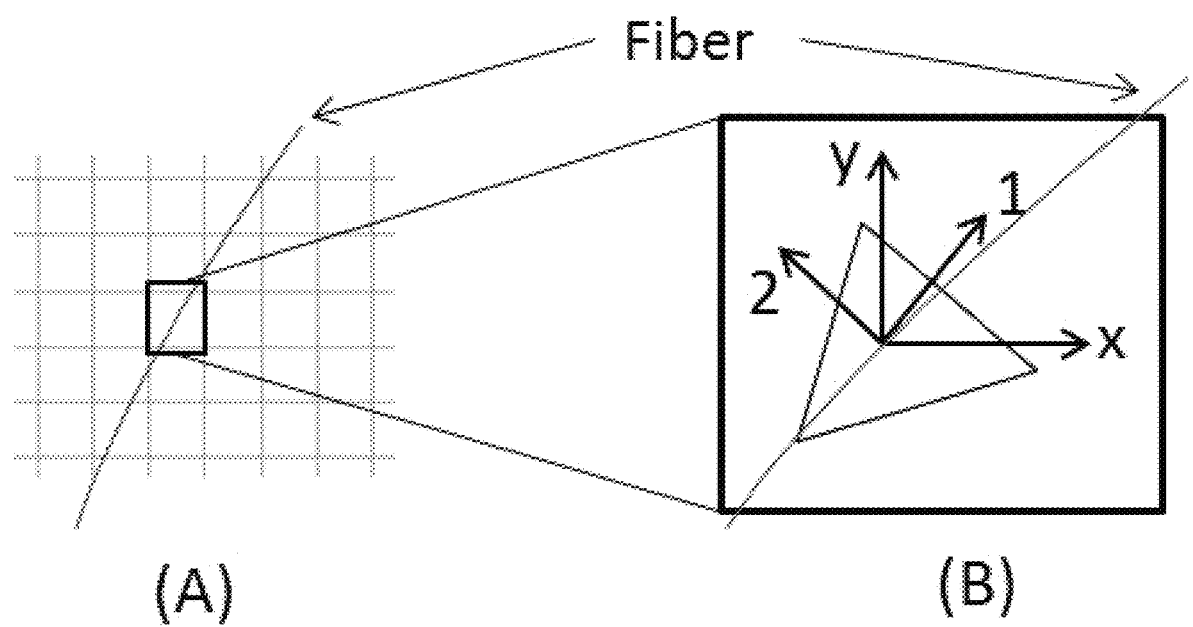
FIG. 10 illustrates a material matrix being transformed from its principal coordinate system to an FEA element coordinate system, according to example embodiments.

While integrating over the triangles, the material matrix Q* may also be transformed from its principal coordinate system to the element coordinate system. As shown in FIG. 10, for every triangle, Q* is transformed once for the triangle's centroid, and the transformed properties Q*' are used for all the quadrature points of that triangle. For instance, FIG. 10 part A depicts an xy cross-section of the Cartesian grid, and an arbitrary fiber in that cross-section. FIG. 10 part B zooms in one of the grid elements and shows a triangle that is being integrated. From the fiber orientation, the material principal directions 1 and 2 are found, which are not aligned to element directions x and y in general.

Regardless, the transformation relation in matrix form is $$Q^{*\prime} = G^T \cdot Q^* \cdot G$$

where G is the transformation matrix.

Finally, plate behavior is assumed in the benchmark laminate problems below, with no distinction between plate and non-plate regions. This assumption is justified because the results obtained with using virtual material models are commensurate with those obtained using dimensionally-reduced models of laminates.

6. Example Numerical Results

In this section, the results of linear static analysis computed using ABD-equivalent materials are compared to results from a standard reference text, as well as to results computed using commercial software packages, for four benchmark problems: a rectangular plate, a cylindrical shell, a cylindrical roof, and a lap joint. The first three structures are single multi-ply laminates, while the lap joint is a bonded assembly of two laminates.

For each of the test structures, the following three configurations are used: cross-ply laminates $[0/90]_n$, angle-ply laminates $[-45/45]_n$, and 50-ply laminates. Cross-ply and angle-ply laminate configurations are often standard configurations. The 50-ply laminate was chosen to test if the features disclosed herein scale for a large number of plies. The plies in the 50-ply laminate were selected randomly. These three laminate configurations are asymmetrical about their mid-plane, and therefore show stretching-bending coupling, as predicted by the classical lamination theory.

TABLE 1

| Material | $E_1$ | $E_2, E_2$ | $v_{12}$ | $v_{23}, v_{13}$ | $G_{12}$ | $G_{13}$ | $G_{23}$ |
|---|---|---|---|---|---|---|---|
| 1 | 25.0e$^6$ psi | 1.0e$^6$ psi | 0.25 | 0.0 | 5.0e$^5$ psi | 5.0e$^5$ psi | 2.0e$^5$ psi |
| 2 | 7.5e$^6$ psi | 2.0e$^6$ psi | 0.25 | 0.0 | 1.25e$^6$ psi | 0.625e$^6$ psi | 0.625e$^6$ psi |

All plies in each laminate are assumed to be made of one of the two materials in Table 1, where E, v, and G are Young's Modulus, Poisson's Ratio, and the Shear Modulus, respectively, and 1, 2 and 3 represent the three principal material directions.

To evaluate the effectiveness of the disclosed embodiments, these embodiments were incorporated into a commercial software package (Scan&Solve—"SnS") that performed structural analysis of the example laminates using the virtual material model. These results were compared to structural analysis results from the same example laminates (but without the virtual material model) from two other commercial software packages (Solidworks and Ansys). The elements available for analyzing laminates in three example systems are different.

In SnS, each benchmark problem was solved using 1000 and 3000 second-order tri-variate B-spline functions on a uniform Cartesian non-conforming grid. The Lobatto quadrature rule implies that 3 integration surfaces per ply for the 3-ply laminate model, and 4 integration surfaces for the quadratically graded laminate model, are sufficient for full integration.

In Solidworks, two-dimensional parabolic triangular shell elements were used.

In Ansys, two-dimensional Shell181 elements were used for analyzing single laminate structures, and Solid186 elements were used for analyzing the lap joint. Shell181 are 4 node elements with 3 displacement and 3 rotational degrees of freedom at each node. A penalty method is used to relate the independent rotational degrees of freedom about the normal (to the shell surface) with the in-plane components of displacements. Solid186 elements are 20-node plied solid elements that exhibit quadratic displacement behavior.

A. Benchmark Problem 1: Clamped Rectangular Plate

TABLE 2

| Laminate (Number of elements) | Thickness a/h | Ansys 10k | SW 1k | SNS-3-Ply 1k | SNS-3-Ply 3k | SNS-Graded 1k | SNS-Graded 3k |
|---|---|---|---|---|---|---|---|
| [0/90]$_5$ | 1 | 10 | $4.758e^{-3}$ | $4.058e^{-3}$ | $3.855e^{-3}$ | $3.762e^{-3}$ | $4.567e^{-3}$ | $3.755e^{-3}$ |
| | 0.1 | 100 | $1.543e^{+0}$ | $1.550e^{+0}$ | $1.532e^{+0}$ | $1.543e^{+0}$ | $1.532e^{+0}$ | $1.543e^{+0}$ |
| | 0.01 | 1000 | $1.510e^{+3}$ | $1.552e^{+3}$ | $1.145e^{+3}$ | $1.661e^{+3}$ | $1.145e^{+3}$ | $1.662e^{+3}$ |
| [−45/45]$_5$ | 1 | 10 | $5.094e^{-3}$ | $4.360e^{-3}$ | $4.057e^{-3}$ | $4.152e^{-3}$ | $4.880e^{-3}$ | $4.050e^{-3}$ |
| | 0.1 | 100 | $1.629e^{+0}$ | $1.620e^{+0}$ | $1.597e^{+0}$ | $1.611e^{+0}$ | $1.598e^{+0}$ | $1.611e^{+0}$ |
| | 0.01 | 1000 | $1.581e^{+3}$ | $1.578e^{+3}$ | $1.163e^{+3}$ | $1.684e^{+3}$ | $1.163e^{+3}$ | $1.685e^{+3}$ |

<small>Note: table shows Laminate, a/h, Number of elements, Ansys, SW, SNS-3-Ply (1k, 3k), SNS-Graded (1k, 3k).</small>

Figure 11:
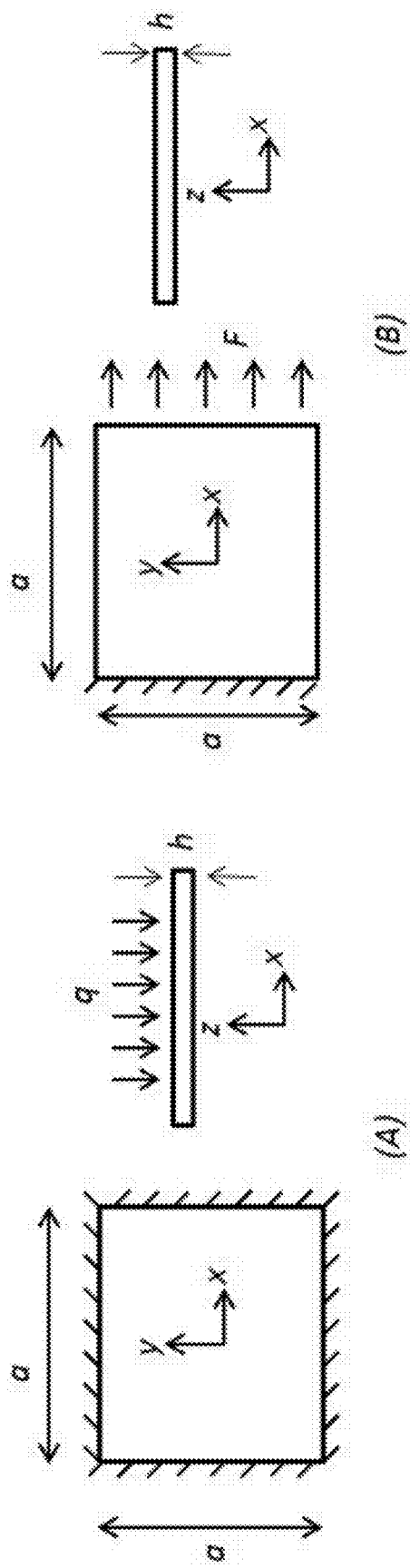
FIG. 11 illustrates a plate clamped on all four sides with normal load, and a plate clamped on one side with in-plane load on the opposite side, according to example embodiments.

The first benchmark problem is a plate clamped on all four sides, with a normal pressure on the top surface, as shown in FIG. 11 part A. Particularly, FIG. 11 part A shows a plate with geometry parameters a=10 inches and h=1, 0.1, 0.01 inches, clamped from all four sides with a surface pressure of q=100 pounds per square inch (psi).

A plate under these boundary conditions shows pure bending, with maximum displacement at the center of the plate. This particular problem was chosen to test if second order B-spline basis in SnS can successfully capture bending in thin structures, since conventional 3D basis functions tend to underestimate bending deformations due to locking. The plate was made of Material 1, and consisted of 10 plies laid in cross-ply and angle-ply configurations.

Table 2 compares the maximum displacements using Ansys, SolidWorks (SW), and the embodiments disclosed herein (SnS) for different laminates. Tests were done for three different aspect ratios: thin (a/h=1000), moderately thick (a/h=100), and thick (a/h=10). For both cross-ply and angle-ply laminates with moderate thickness, the virtual material model accurately predicts the maximum displacement values, and the results from all the systems are in close agreement. There are more noticeable differences in the displacements computed by the three systems for thin and thick laminates, e.g., the virtual material model and SW tend to differ by about 5%. However, the virtual material model is not under-predicting displacements for thin plates, suggesting that locking is not an issue.

Tests were also performed on the same plate but when that plate is made of 50 random plies. The boundary conditions are different from the previous tests—the plate is under an in-plane load of 10 e$^4$ pounds of force (lbf) on one end and clamped at the opposite end, as shown in FIG. 11 part B.

This particular problem illustrates the validity of two aspects of the virtual material model procedures disclosed herein. First, these procedures can support a large number of plies. Second, ABD-equivalent material models successfully capture coupling behavior in laminates that are asymmetrical about the mid-plane. Due to this coupling, the in-plane load F will lead to bending and produces out-of-plane deformation.

Figure 12:
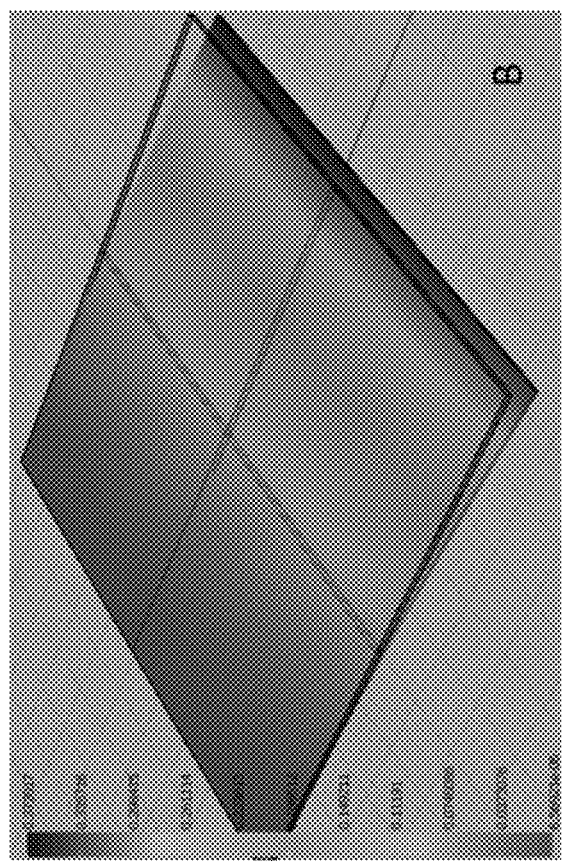
FIG. 12 illustrates how ABD-equivalent material models capture a coupling phenomenon in laminates, according to example embodiments.
Figure 12:
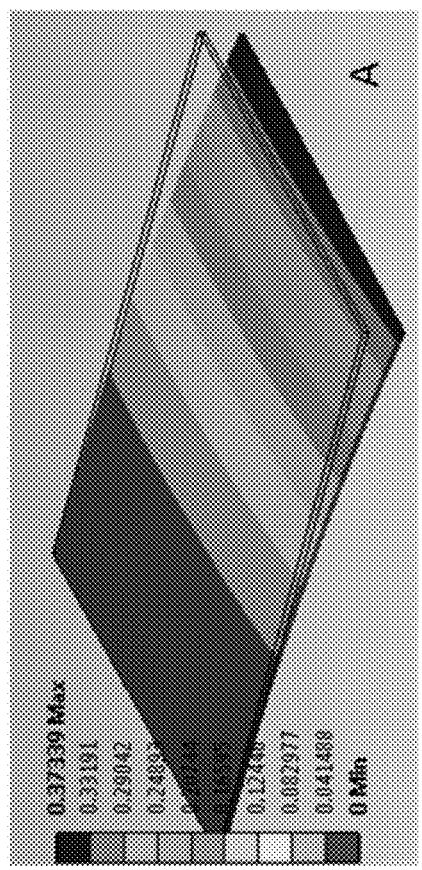

The ABD-equivalent material models capture this coupling phenomenon accurately as shown in FIG. 12, which compares the z displacement fields from Ansys and SnS. Particularly, Ansys results are shown in FIG. 12 part A and SnS results are shown in FIG. 12 part B. The SnS results were calculated over an ABD-equivalent 3-ply material model, for a laminate plate made of 50 plies. As depicted in FIG. 12, the in-plane load leads to out-of-plane bending. The maximum z displacement of 0.3730 inches in Ansys (FIG. 12 part B) and 0.3734 inches in SnS (FIG. 12 part A) are in agreement.

A time analysis was performed in order to estimate the net efficiency achieved using the virtual material model. Complete analysis of the 50-ply laminate plate using the ABD-equivalent 3-ply model took 14.9 seconds, out of which 12.8 seconds were spent integrating 9 integration surfaces (3 surfaces per ply). Therefore, an average of 1.42 seconds was spent integrating each surface. This implies that integrating over 150 surfaces in the original 50-ply model would require roughly 215 seconds for the same analysis. The gain in efficiency is even higher when using graded material model, as it uses only 4 integration surfaces in comparison to 9 for the 3-ply laminate. The total time taken for analysis was only 6.8 seconds, decreasing the total computation cost of analysis by more than 30 times.

B. Benchmark Problem 2: Clamped Cylinder with Internal Pressure

Figure 13:
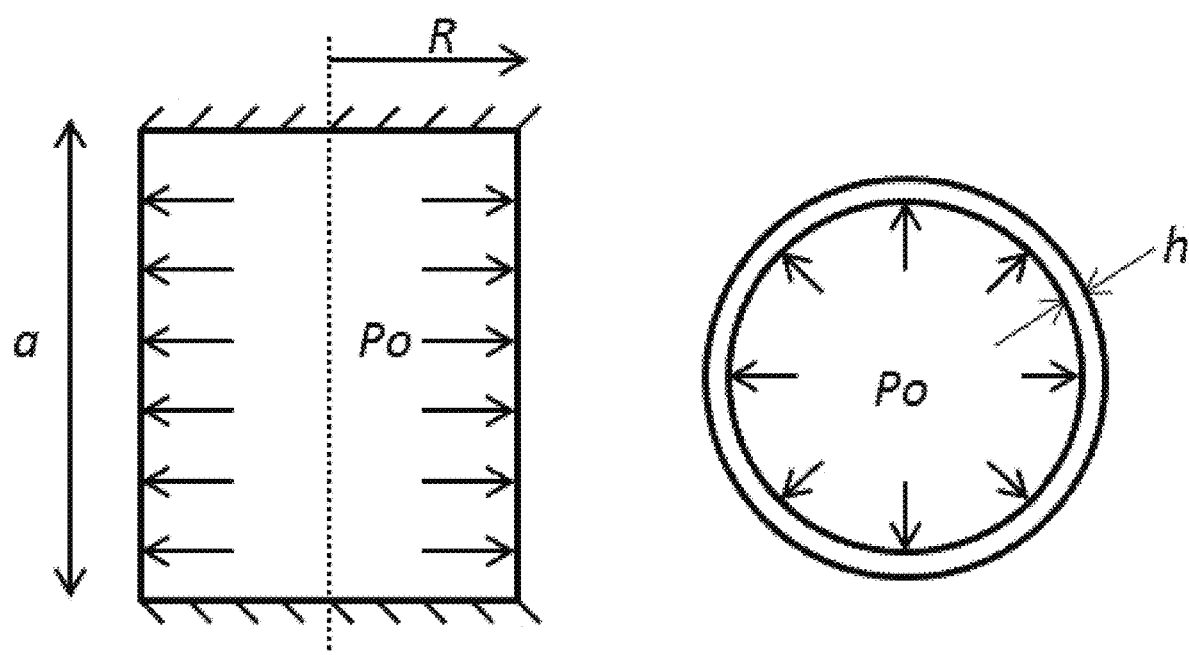
FIG. 13 illustrates a clamped cylinder with internal pressure, according to an example embodiment.

For this benchmark problem, a cylinder, made of Material 2, which is clamped at the two ends and has an internal pressure of $P_o$, is considered. Details of the cylinder's geometry and boundary conditions are shown in FIG. 13. Particularly, the clamped cylinder of FIG. 13 exhibits $P_o$=2.04 kilopounds per square inch (ksi), a radius (R) of 20 inches, height (a) of 20 inches, and thickness (h) of 1 inch.

The maximum radial deflections from J. N. Reddy, Mechanics of Laminated Composite Plates and Shells: Theory and Analysis, CRC press, 2004 (Reddy), Ansys, SolidWorks, and the virtual material model are compared in Table 3. Elements used by Reddy are Q4 elements, a four-node (linear) quadrilateral element, and Q9 elements, a nine-node (quadratic) quadrilateral element. The total number of elements used in different methods is specified in the second row of Table 3. The tests were performed for one aspect ratio, but five different laminates. Results from all the methods are clearly in agreement.

TABLE 3

| Laminate | Q4 16 | Q9 4 | Ansys 15k | SW 1.2k | SNS-3-Ply 1k | SNS-3-Ply 3k | SNS-Graded 1k | SNS-Graded 3k |
|---|---|---|---|---|---|---|---|---|
| [0/90] | 1.870 | 1.803 | 1.706 | 1.848 | 1.820 | 1.773 | 1.820 | 1.773 |
| [−45/45] | — | — | 2.204 | 2.350 | 2.356 | 2.291 | 2.355 | 2.290 |
| [0/90]$_5$ | — | — | 1.719 | 1.830 | 1.814 | 1.776 | 1.815 | 1.776 |
| [−45/45]$_5$ | — | — | 2.210 | 2.340 | 2.334 | 2.282 | 2.334 | 2.281 |
| 50-ply | — | — | 2.350 | 2.542 | 2.465 | 2.424 | 2.464 | 2.424 |

Figure 14:
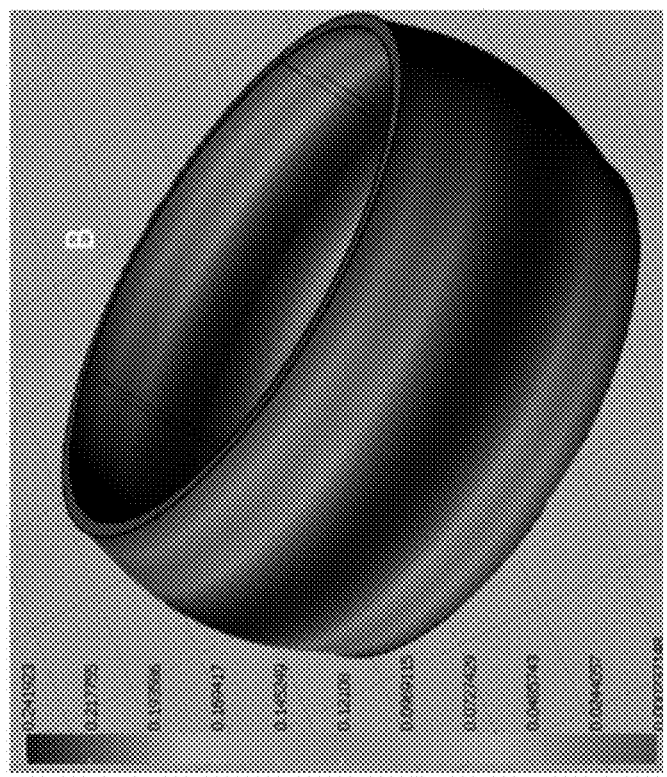
FIG. 14 illustrates shapes, as well as displacement values for laminate cylinders, according to example embodiments.
Figure 14:
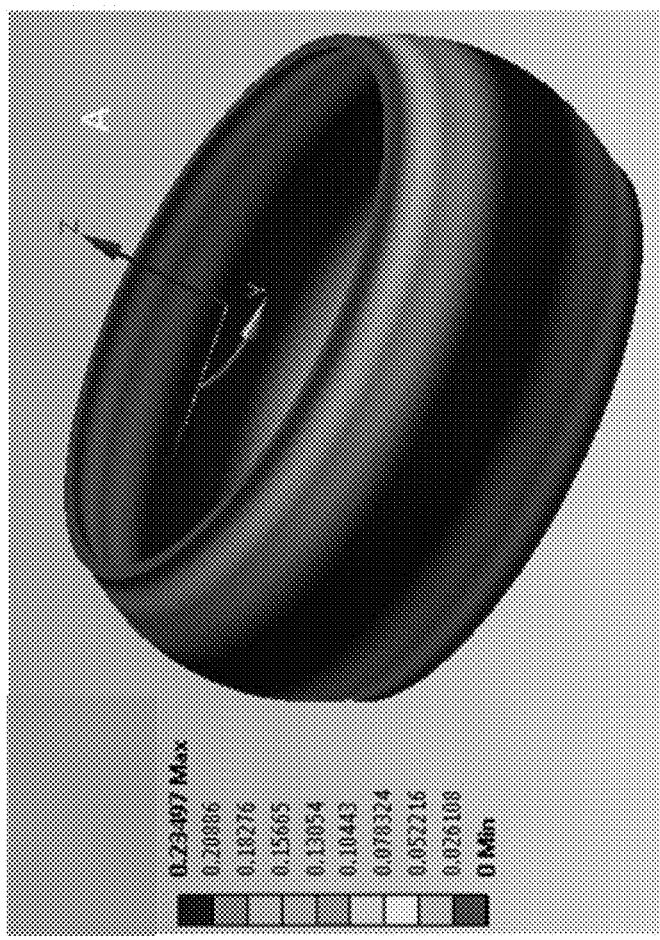

FIG. 14 shows the deformed shape, as well as the displacement value for the cylinder made of 50 plies. Maximum radial displacement using Ansys is 0.2350 inches (FIG. 14 part A), and using the 3-ply material model in SnS is 0.2419 inches (FIG. 14 part B), which is less than a 3% difference.

C. Benchmark Problem 3: Barrel Vault

Figure 15:
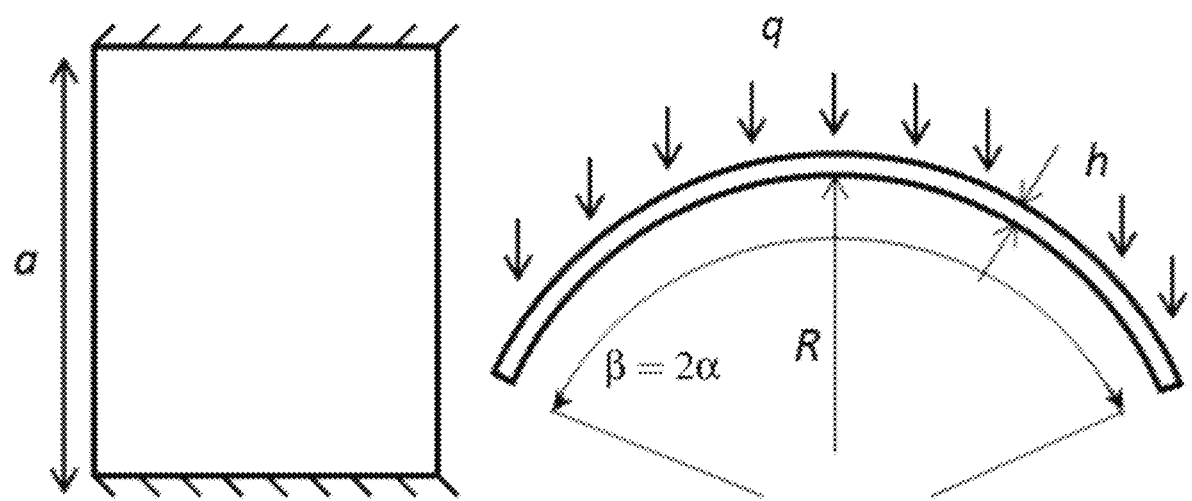
FIG. 15 illustrates a barrel vault laminate, according to an example embodiment.

Another benchmark shell problem is known as the barrel vault problem, which models a cylindrical roof under its own weight. The structure is made of Material 1, and the detailed boundary conditions are shown in FIG. 15. In this figure, the vertical pressure is q=0.625 psi and the curved ends are fixed. The angular width of the roof is β=80 degrees, the radius is R=300 inches, the length of the roof a=600 inches, and the thickness of the roof h takes on values of 3, 6, and 15 inches.

TABLE 4

| Laminate | R/h | Reddy | Ansys | SW | SNS-3-Ply | | SNS-Graded | |
|---|---|---|---|---|---|---|---|---|
| (Number of elements) | | 16 | 10k | 1.2k | 1k | 3k | 1k | 3k |
| [0/90] | 100 | $2.339e^{+0}$ | $2.407e^{+0}$ | $2.460e^{+0}$ | $2.307e^{+0}$ | $2.415e^{+0}$ | $2.307e^{+0}$ | $2.416e^{+0}$ |
| | 50 | $5.082e^{-1}$ | $5.291e^{-1}$ | $5.659e^{-1}$ | $5.480e^{-1}$ | $5.810e^{-1}$ | $5.496e^{-1}$ | $5.503e^{-1}$ |
| | 20 | $7.292e^{-2}$ | $7.449e^{-2}$ | $7.560e^{-2}$ | $7.877e^{-2}$ | $8.067e^{-2}$ | $7.956e^{-2}$ | $7.016e^{-2}$ |
| [−45/45] | 100 | $3.597e^{+0}$ | $3.871e^{+0}$ | $3.866e^{+0}$ | $3.411e^{+0}$ | $3.743e^{+0}$ | $3.413e^{+0}$ | $3.699e^{+0}$ |
| | 50 | $6.760e^{-1}$ | $7.652e^{-1}$ | $7.170e^{-1}$ | $6.675e^{-1}$ | $7.157e^{-1}$ | $6.671e^{-1}$ | $7.780e^{-1}$ |
| | 20 | $1.205e^{-1}$ | $1.397e^{-1}$ | $1.130e^{-1}$ | $1.061e^{-1}$ | $1.127e^{-1}$ | $1.131e^{-1}$ | $1.386e^{-1}$ |
| $[0/90]_5$ | 100 | $1.415e^{+0}$ | $1.434e^{+0}$ | $1.564e^{+0}$ | $1.542e^{+0}$ | $1.593e^{+0}$ | $1.540e^{+0}$ | $1.593e^{+0}$ |
| | 50 | $2.940e^{-1}$ | $2.979e^{-1}$ | $3.270e^{-1}$ | $3.335e^{-1}$ | $3.412e^{-1}$ | $3.337e^{-1}$ | $3.412e^{-1}$ |
| | 20 | $5.234e^{-2}$ | $5.246e^{-2}$ | $5.370e^{-2}$ | $5.361e^{-2}$ | $5.398e^{-2}$ | $5.361e^{-2}$ | $5.399e^{-2}$ |
| $[-45/45]_5$ | 100 | $1.818e^{+0}$ | $1.836e^{+0}$ | $1.955e^{+0}$ | $1.821e^{+0}$ | $1.912e^{+0}$ | $1.821e^{+0}$ | $1.912e^{+0}$ |
| | 50 | $4.096e^{-1}$ | $4.082e^{-1}$ | $4.089e^{-1}$ | $3.796e^{-1}$ | $3.940e^{-1}$ | $3.799e^{-1}$ | $3.940e^{-1}$ |
| | 20 | $1.004e^{-1}$ | $9.727e^{-2}$ | $8.959e^{-2}$ | $7.856e^{-2}$ | $8.009e^{-2}$ | $7.857e^{-2}$ | $8.088e^{-2}$ |
| 50-ply | 100 | — | $1.4106e^{0}$ | $1.478e^{0}$ | $1.391e^{0}$ | $1.445e^{0}$ | $1.391e^{0}$ | $1.445e^{0}$ |

In Reddy, the maximum vertical displacements are given for cross-ply and angle-ply laminates with different aspect ratios. These values are used for comparing values obtained using SW, Ansys, and the virtual material model in Table 4. Reddy used Q81 elements, which are eighth order element (p=8) with 405 degrees of freedom. For other methods, elements are same as before.

Figure 16:
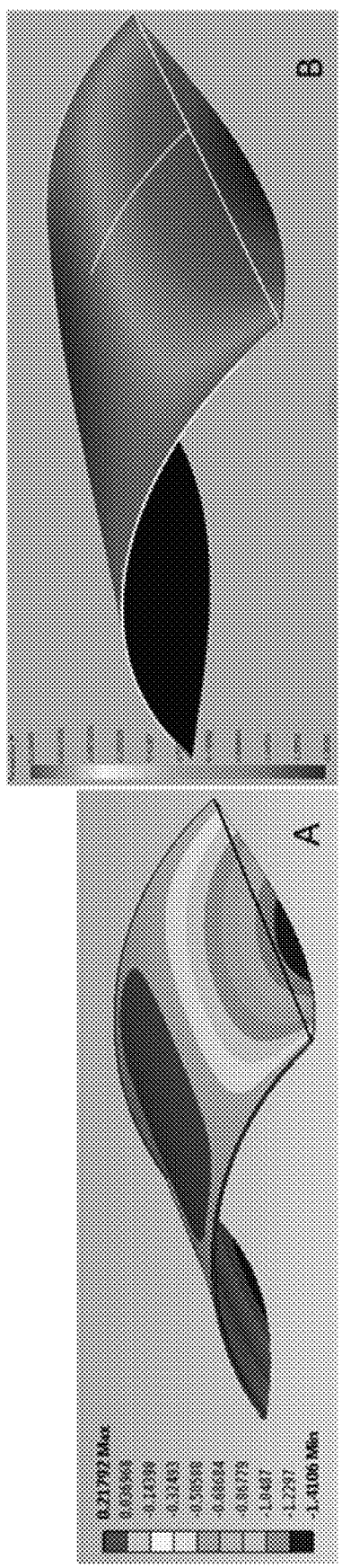
FIG. 16 illustrates a deformed plate and colormap of out-of-plane displacement for a barrel vault laminate, according to example embodiments.

Again, there is a fairly close agreement between the results from Reddy, S W, Ansys, and the virtual material model in all cases, including the 50-ply laminate. For instance, FIG. 16 shows the deformed plate and the colormap of out-of-plane displacement obtained using ANSYS (FIG. 16 part A) and the virtual material model (FIG. 16 part B), for a laminate plate made of 50 plies. Due to non-zero coupling matrix B, in-plane loads lead to out-of-plane bending.

The maximum displacement values from SnS using 3000 elements and Ansys are within 2.5% of each other. As before, for the 50-ply laminates, using the 3-ply laminate improves computational efficiency roughly 15 times, whereas using the graded material was 30 times more efficient than using the actual laminate structure.

7. Benchmark Problem 4: Multi-Laminate Lap Joint

To demonstrate that virtual material models can be extended to structures made of multiple laminates, a lap joint made of two laminates bonded together can be analyzed. Lap joints are common in real-life structures (e.g., anywhere two pieces of material are joined together by overlapping), and exhibit complex deformation fields, even though they may have a simple geometry. As discussed earlier, direct application of 2D finite element methods does not capture 3D phenomena in lap joints. In contrast, 3D FEA using a non-conforming mesh can be used to simulate lap joints made of homogeneous materials, even when extended to laminate structures using ABD-equivalent materials.

Figure 17:
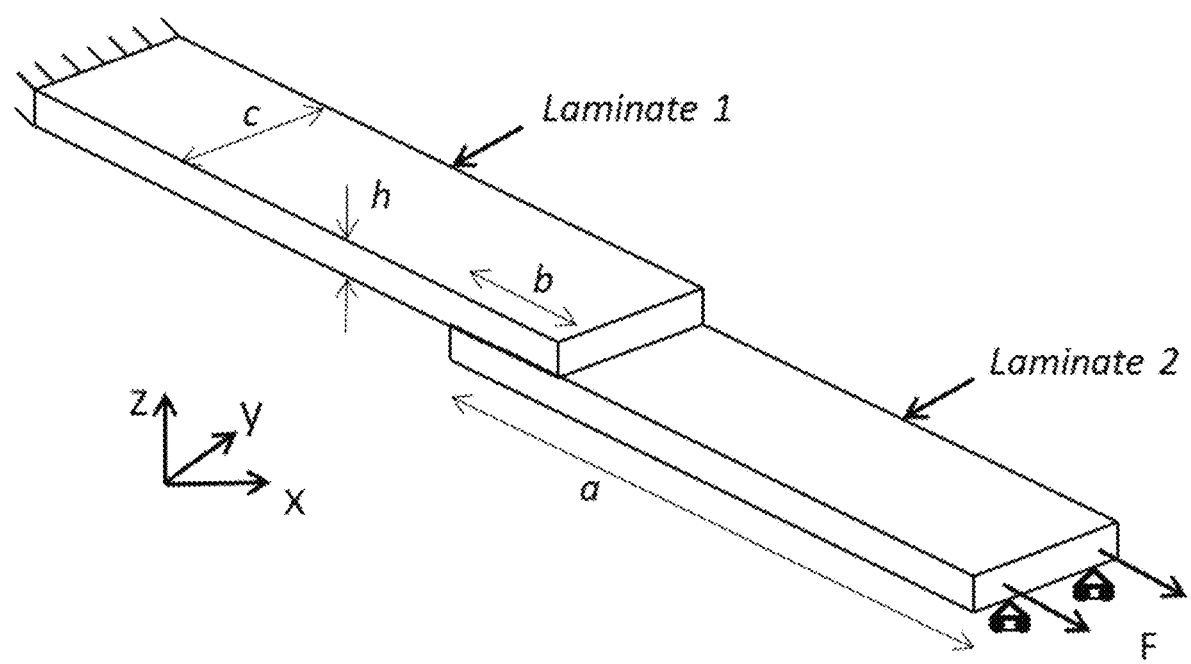
FIG. 17 illustrates the geometry and boundary conditions of a lap joint, according to an example embodiment.
Figure 18:
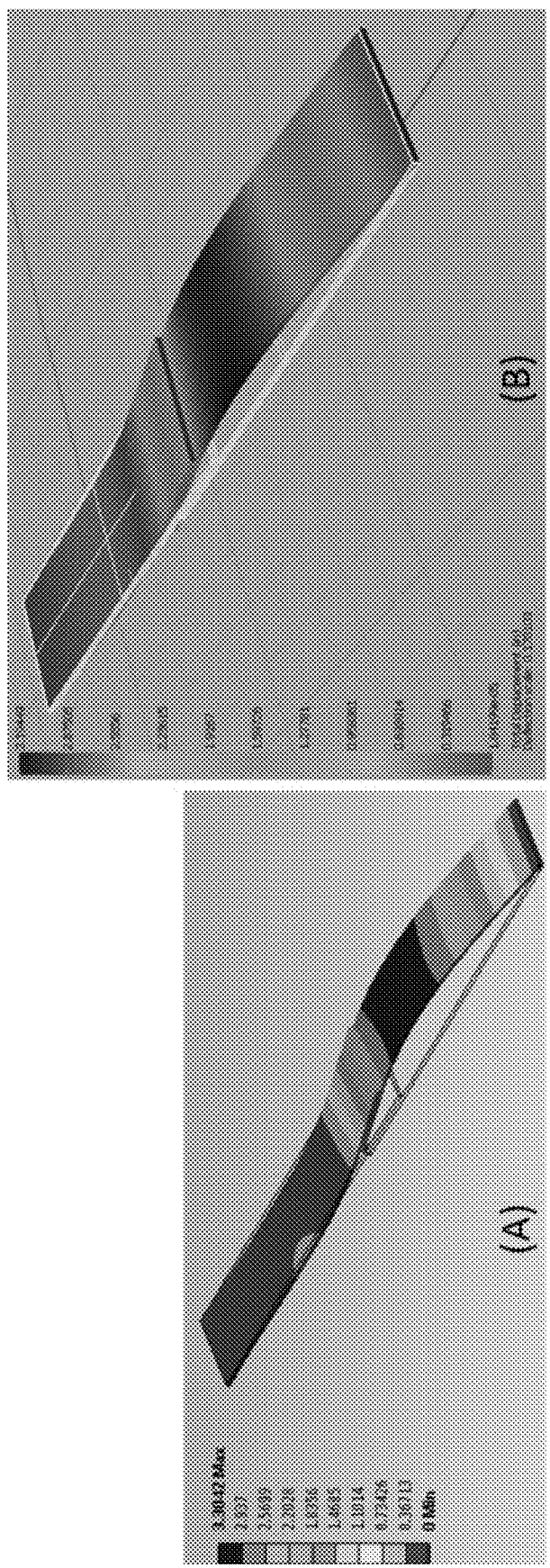
FIG. 18 illustrates the deformed plate and the colormap of out-of-plane displacement for a lap joint, according to example embodiments.

The geometry and boundary conditions of the lap joint analyzed are shown in FIG. 17. The two laminates are made of Material 1, and the adhesive ply has been ignored for simplicity. The virtual material model results computed in SnS using ABD-equivalent materials are compared to those computed in Ansys using a 20-node plied solid element (since 2D shell elements are not appropriate). Table 5 shows that the maximum displacement values are in close agreement. FIG. 18 shows the deformed plate and the colormap of out-of-plane displacement obtained using ANSYS (FIG. 18 part A) and the virtual material model (FIG. 18 part B), for a laminate plate made of 50 plies. Due to non-zero coupling matrix B, in-plane loads lead to out-of-plane bending.

TABLE 5

| | Ansys | SNS-3-Ply | | SNS-Graded | |
|---|---|---|---|---|---|
| Laminate | 760 | 1k | 3k | 1k | 3k |
| $[0/90]_5$ | 1.251 | 1.147 | 1.212 | 1.147 | 1.212 |
| $[-45/45]_5$ | 7.975 | 6.540 | 7.641 | 6.540 | 7.641 |
| 50-ply | 3.304 | 2.937 | 3.194 | 2.938 | 3.195 |

The virtual material model accurately captures coupling phenomena in multi-laminate structures. For instance, consider the same lap joint, but made of laminates with substantial stretching-bending coupling properties. In laminate [0/90], there is a strong coupling between in-plane stretching and out-of-plane cylindrical bending, while in laminate [−45/45], there is a strong coupling between in-plane stretching and out-of-plane twisting.

Figure 19:
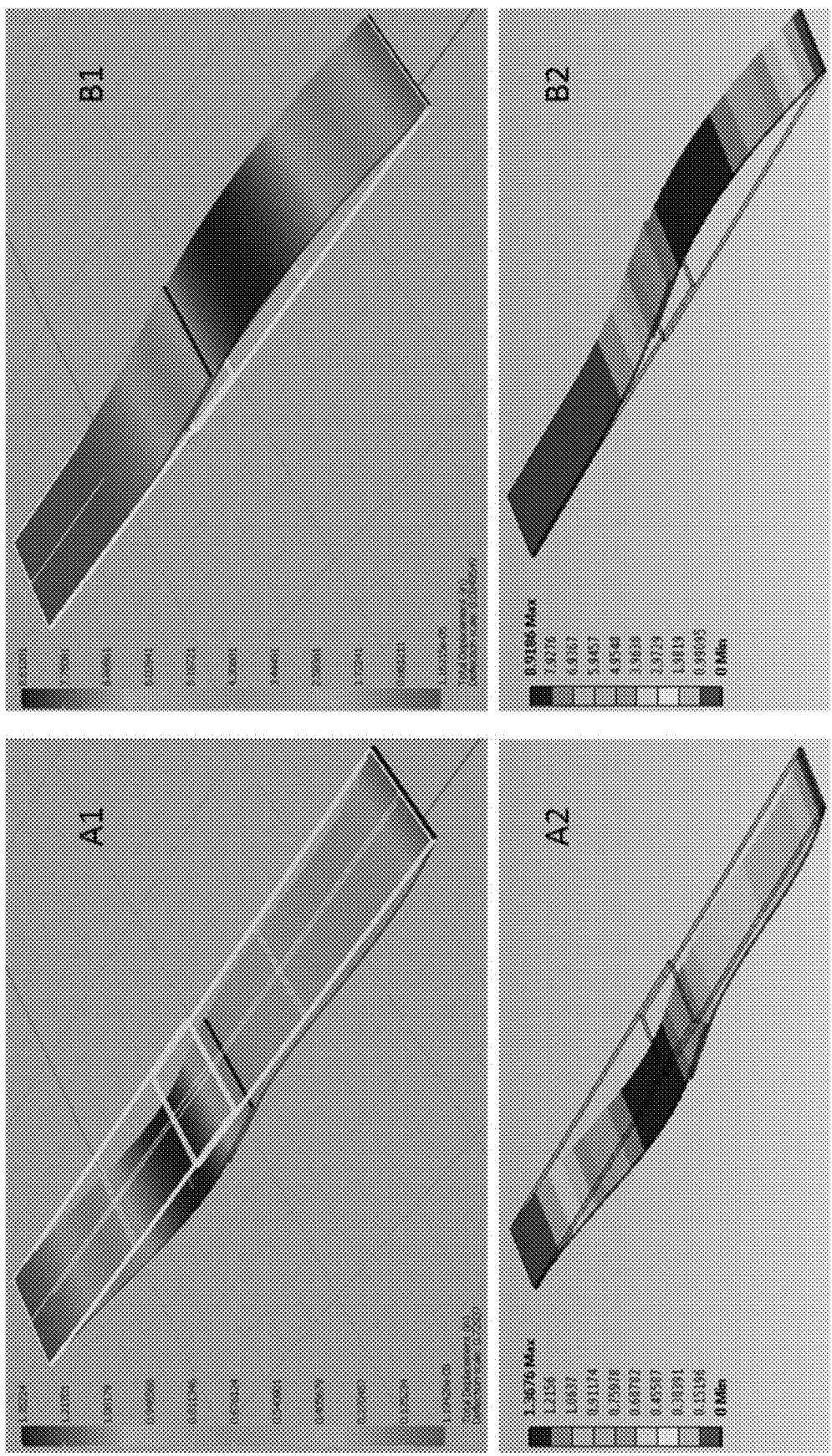
FIG. 19 illustrates deformation in a lap joint made of laminate [0/90], according to example embodiments.

For both the laminates, deformation in the lap joint is compared in two cases. The first case is for laminate [0/90], when 0 degree plies are bonded together (FIG. 19 part A) and when 90 degree plies are bonded together (FIG. 19 part B). Particularly, FIG. 19 part A shows deformation in the lap joint made of laminate [0/90] in SnS (part A1), and the deformation in the lap joint made of laminate [0/90] in Ansys when 0 degree plies of the two laminates are bonded (part A2). FIG. 19 part B shows deformation in the lap joint when 90 degree plies of the two laminates are bonded for SnS (part B1) and Ansys (part B2).

Figure 20:
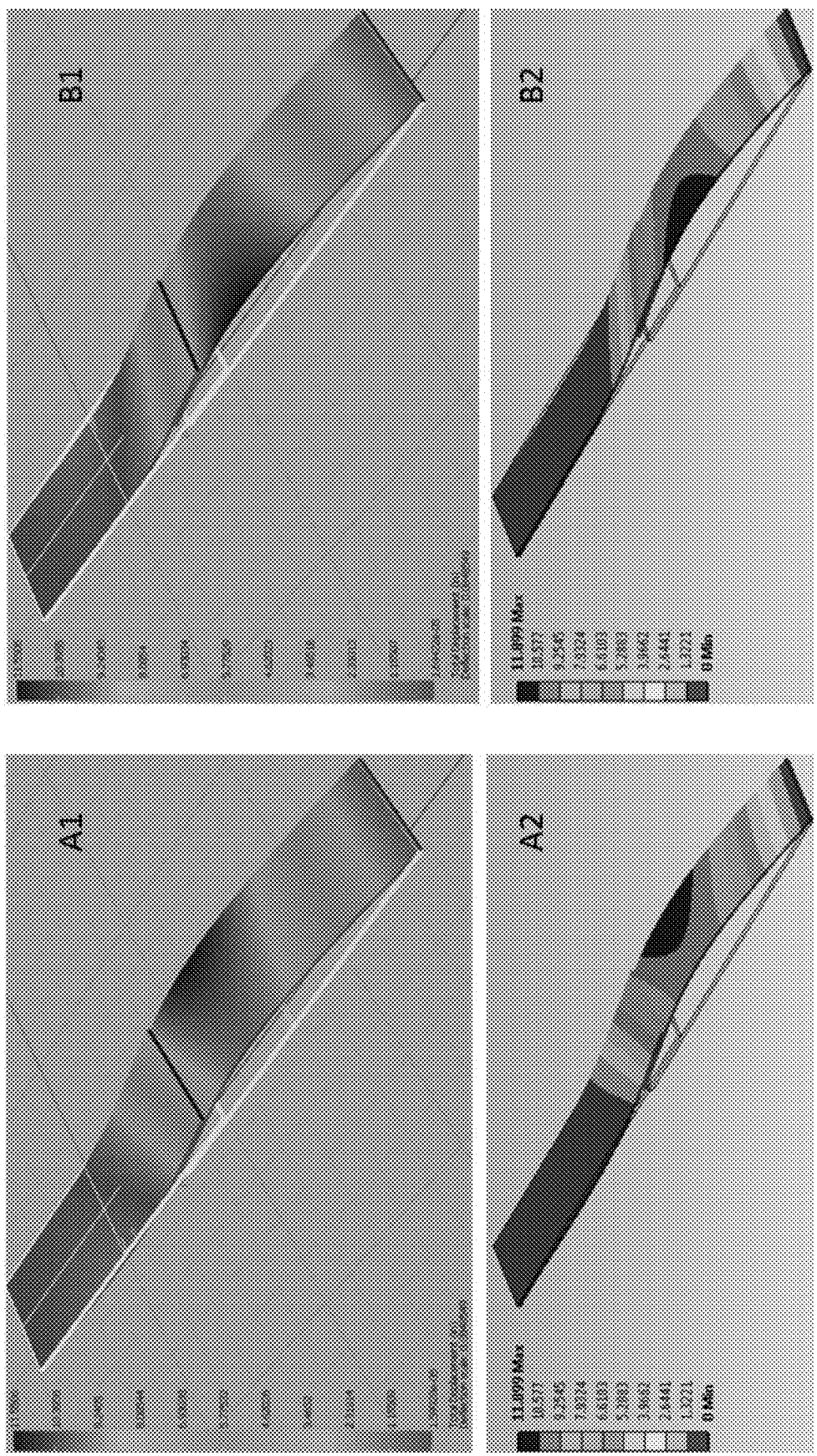
FIG. 20 illustrates deformation in a lap joint made of laminate [−45/45], according to example embodiments.

The second case is for laminate [−45/45], when 45 degree plies are bonded together (FIG. 20 parts A1 and A2) and when −45 degree plies are bonded together (FIG. 20 parts B1 and B2). Particularly, FIG. 20 parts A1 and A2 show deformation in lap joint made of laminate [−45/45] in SnS (part A1), and Ansys (part A2) when 45 degree plies of the two laminates are bonded. FIG. 20 parts B1 and B2 show deformation in the lap joint when −45 degree plies of the two laminates are bonded for SnS (part B1) and Ansys (part B2).

As can be seen in these figures, the deformation in the lap joints obtained using the virtual material model and Ansys agree. The lap joints in FIGS. 19 and 20 exhibit significantly different deformation patterns, even though the geometry and the boundary conditions are identical. A plausible explanation is as follows. When stretching-bending coupling is not strong, bending due to eccentric forces in the lap joint dominates, and the deformed lap joint looks like FIG. 18. However, for the lap joint made of [0/90] laminate in FIG. 19 parts A1 and A2, stretching-bending coupling is strong and, in Laminate 2, the resultant moment is in the direction opposite to the direction of the moment due to eccentric forces. This causes Laminate 2 to bend in the opposite direction when compared to FIG. 18. On the other hand, for Laminate 2 of the lap joint in FIG. 19 parts B1 and B2, bending due to stretching-bending coupling is in the same direction as bending due to the eccentric forces. Therefore, the out-of-plane deformation pattern is similar, but higher in value when compared to the deformation in FIG. 18. For the lap joint made of [−45/45] laminate in FIG. 20, twisting moment is generated due to coupling in addition to the bending moment due to eccentric forces; therefore, the out-of-plane deformation is not uniform in the width, or y, direction. The direction of the twist reverses when the −45 degree plies are bonded together instead of the 45 degree plies.

8. Applications and Example Operations

The embodiments disclosed herein include a new approach to modeling composite laminates that allows significant reduction in computational cost of 3D structural simulation. The essence of the approach is to replace some or all of the actual n-ply laminate structure with a virtual ABD-equivalent material model that behaves identically under the assumption of the lamination theory, but is much simpler to analyze.

This behavior has been demonstrated in two such models—a 3-ply model, and a quadratically varying graded material model. The complexity of these models remains constant and is independent of the complexity of the actual physical laminate. This implies that the computational efficiency gain grows linearly. Thus, for an n-ply laminate structure, one can expect O (n/3) efficiency gain with the 3-ply model and O (3n/4) for the graded model using Lobatto quadrature rules for integration.

These ABD-equivalent models can be implemented in any 3D FEA system that supports laminates, effectively taking advantage of dimensional reduction while still using general 3D finite elements. Additionally, with a suitable choice of basis functions, the ABD-equivalent models make 3D FEA practical and efficient enough to be considered an attractive alternative to existing semi-automated methods.

The proposed ABD-equivalent material models have been validated by showing that their use in 3D meshfree analysis system leads to results that are consistently in good agreement with known results for several benchmark problems. In the numerical tests, the ABD-equivalent material model was used everywhere in the laminate structures, but in practice, ABD-equivalent material models might be used only in plate/shell regions of the structures.

Figure 21:
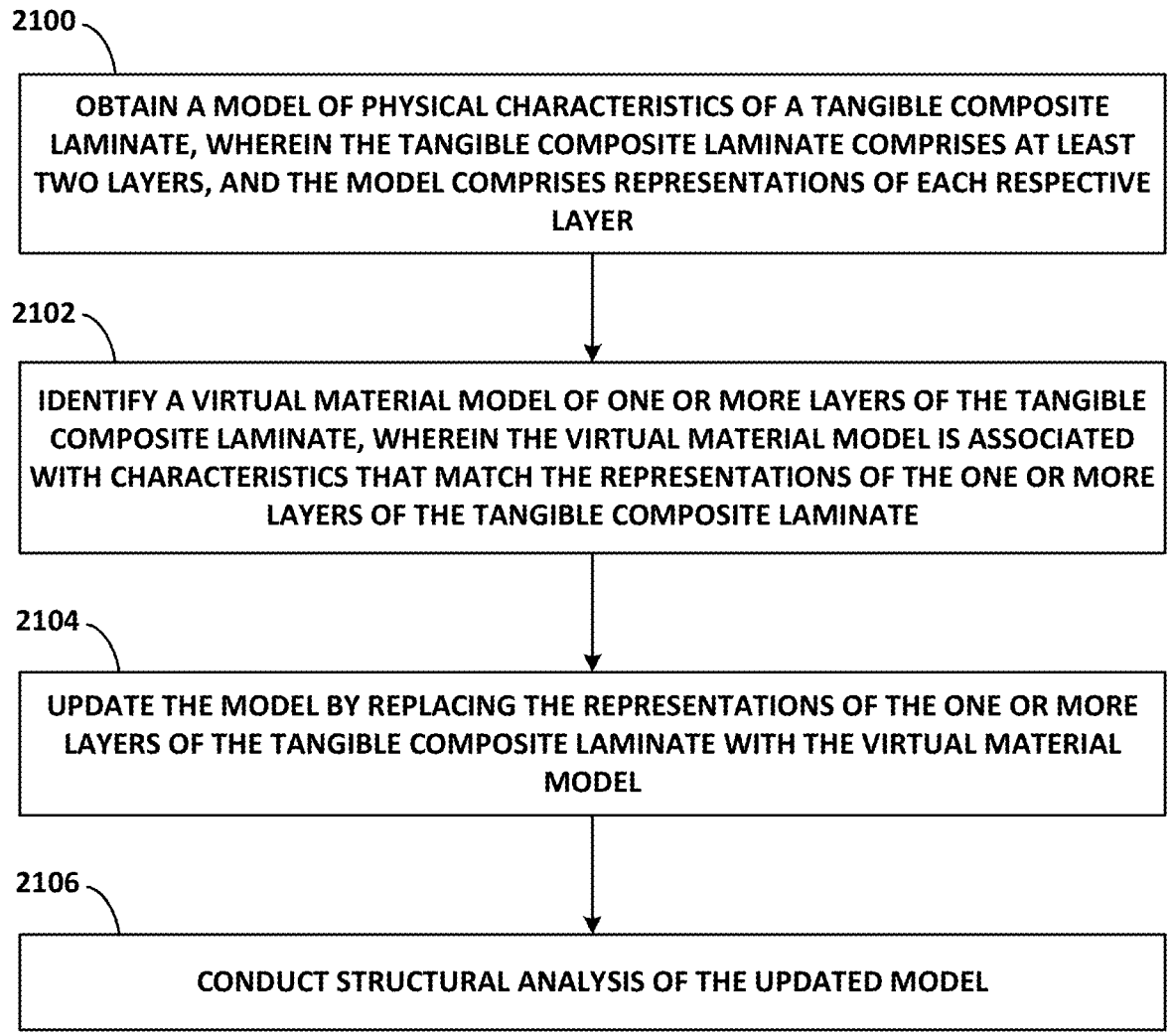
FIG. 21 is a flow chart, according to an example embodiment.

FIG. 21 is a flow chart illustrating a procedure according to example embodiments. This procedure may be carried out by a computing device, such as computing device 200, and/or a cluster of computing devices, such as server cluster 304. However, the procedure can be carried out by other types of devices or device subsystems.

At block 2100, a model of physical characteristics of a tangible composite laminate may be obtained. The tangible composite laminate may include at least two plies, and the model may include representations of each respective ply. Obtaining the model of the physical characteristics of the tangible composite laminate may involve conducting measurement of the physical characteristics of the tangible composite laminate.

At block 2102, a virtual material model of one or more plies of the tangible composite laminate may be identified. The virtual material model may be associated with characteristics that match the representations of the one or more plies of the tangible composite laminate. For example, the virtual material model may have approximately the same stress and strain relationship as the one or more plies of the tangible composite laminate. In other words, the stress, strain, and displacement characteristics of the virtual material model and the tangible composite laminate may agree to within, for instance, 15 percent, 10 percent, or 5 percent. (The displacement characteristics are provided for given loads and material properties by the FEA, whereas strains are determined as derivative of the displacement characteristics, and stresses are determined using stress/strain relationships.)

At block 2104, the model may be updated by replacing the representations, in the model, of the one or more plies of the tangible composite laminate with the virtual material model.

At block 2106, a structural analysis of the updated model may be conducted. Conducting structural analysis of the updated model may involve performing FEA of the model with the representations of the one or more plies replaced by the virtual material model.

More than one virtual material model may be used in this fashion. Thus, in some situations, multiple virtual material models may replace the representations of respective groups of one or more plies of the tangible composite laminate. Each of the multiple virtual material models may be different. For instance, in a 10-ply laminate, plies 1-7 may be replaced by a first virtual material model, plies 8-10 may be replaced by a second virtual material model.

In some cases, the virtual material model may be ABD-equivalent to the one or more plies of the tangible composite laminate. For instance, the virtual material model may represent a 3-ply laminate that is ABD-equivalent to the one or more plies of the tangible composite laminate. Alternatively or additionally, the virtual material model may represent a graded anisotropic material that is ABD-equivalent to the one or more plies of the tangible composite laminate. The graded anisotropic material may be a quadratically graded anisotropic material.

Some embodiments may further involve determining that the characteristics of the virtual material model match those of a physical material that is not the tangible composite laminate. Then, based on the characteristics of the virtual material model matching those of the physical material that is not the tangible composite laminate, the physical material may be manufactured. For instance, characteristics of the virtual material model may be used in conjunction with a 3D printer to form a physical sample of the virtual material.

Additional embodiments may involve conducting structural analysis of the model. Some embodiments may involve determining that results from conducting structural analysis of the updated model are within a threshold value of results from conducting structural analysis of the original model. The threshold value may be 5 percent or less. In some implementations of the structural analyses, conducting structural analysis of the updated model takes less than 10 percent of the computational time used for conducting structural analysis of the model.

Further embodiments may involve using a general 3D laminate analysis, but when this analysis determines that special conditions apply (e.g., joints and/or discontinuities), it will switch to a simplified virtual material model. This way, the generality of 3D and efficiency of simplified models may be attained.

FIG. 21 depicts non-limiting embodiments. Thus, more or fewer steps than shown in FIG. 21 may be used without departing from the scope of the embodiments herein. Additionally, some of the depicted steps may be repeated one or more times, or may be omitted altogether. Further, the procedure illustrated by the flow chart of FIG. 21 may be combined with one another and/or with other aspects described this specification and its accompanying drawings, in whole or in part, also without departing from the scope of the embodiments herein.

9. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrent or in reverse order, depending on the functionality involved. Further, more or fewer blocks and/or operations can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical operations of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
obtaining a model of physical characteristics of a tangible composite laminate, wherein the tangible composite laminate comprises at least two plies, and the model comprises representations of each respective ply in ABD matrix form, wherein the ABD matrix form is based on a combination of: an A matrix that characterizes extensional components of the respective ply, a D matrix that characterizes bending components of the respective ply, and a B matrix that characterizes bending and stretching of the respective ply when material properties of the respective ply are asymmetrical about its mid-plane;
identifying a virtual material model of one or more plies of the tangible composite laminate, wherein the virtual material model is associated with characteristics that match the ABD matrix form representations of the one or more plies of the tangible composite laminate;
updating the model by replacing the representations of the one or more plies of the tangible composite laminate with the virtual material model; and
conducting, by a computing device, structural analysis of the updated model.

2. The computer-implemented method of claim 1, wherein obtaining the model of the physical characteristics of the tangible composite laminate comprises conducting measurement of the physical characteristics of the tangible composite laminate.

3. The computer-implemented method of claim 1, wherein conducting structural analysis of the updated model comprises performing finite element analysis of the model with the representations of the one or more plies replaced by the virtual material model.

4. The computer-implemented method of claim 1, wherein the virtual material model represents a three-ply laminate that matches the ABD matrix forms of the one or more plies of the tangible composite laminate.

5. The computer-implemented method of claim 1, wherein the virtual material model represents a graded anisotropic material that the one or more plies of the tangible composite laminate.

6. The computer-implemented method of claim 5, wherein the graded anisotropic material is a quadratically graded anisotropic material.

7. The computer-implemented method of claim 1, further comprising:
determining that the characteristics of the virtual material model match those of a physical material that is not the tangible composite laminate; and
based on the characteristics of the virtual material model matching those of the physical material that is not the tangible composite laminate, manufacturing the physical material.

8. The computer-implemented method of claim 1, wherein the virtual material model being associated with characteristics that match the ABD matrix form representations of the one or more plies of the tangible composite laminate comprises the virtual material model having approximately the same stress and strain relationship as the one or more plies of the tangible composite laminate.

9. The computer-implemented method of claim 1, further comprising:
determining that results from conducting structural analysis of the updated model are within a threshold value of results from conducting structural analysis of the model.

10. The computer-implemented method of claim 9, wherein the threshold value is 5 percent or less.

11. The computer-implemented method of claim 9, wherein conducting structural analysis of the updated model takes less than 10 percent of computational time used for conducting structural analysis of the model.

12. An article of manufacture including a non-transitory computer-readable medium, having stored thereon program instructions that, upon execution by a computing device, cause the computing device to perform operations comprising:
obtaining a model of physical characteristics of a tangible composite laminate, wherein the tangible composite laminate comprises at least two plies, and the model comprises representations of each respective ply in ABD matrix form, wherein the ABD matrix form is based on a combination of: an A matrix that characterizes extensional components of the respective ply, a D matrix that characterizes bending components of the respective ply, and a B matrix that characterizes bending and stretching of the respective ply when material properties of the respective ply are asymmetrical about its mid-plane;
identifying a virtual material model of one or more plies of the tangible composite laminate, wherein the virtual material model is associated with characteristics that match the ABD matrix form representations of the one or more plies of the tangible composite laminate;
updating the model by replacing the representations of the one or more plies of the tangible composite laminate with the virtual material model; and
conducting structural analysis of the updated model.

13. The article of manufacture of claim 12, wherein conducting structural analysis of the updated model comprises performing finite element analysis of the model with the representations of the one or more plies replaced by the virtual material model.

14. The article of manufacture of claim 12, wherein the operations further comprise:
determining that results from conducting structural analysis of the updated model are within a threshold value of results from conducting structural analysis of the model.

15. A computing device comprising:
at least one processor;
memory; and
program instructions, stored in the memory, that upon execution by the at least one processor cause the computing device to perform operations comprising:
obtaining a model of physical characteristics of a tangible composite laminate, wherein the tangible composite laminate comprises at least two plies, and the model comprises representations of each respective ply in ABD matrix form, wherein the ABD matrix form is based on a combination of: an A matrix that characterizes extensional components of the respective ply, a D matrix that characterizes bending components of the respective ply, and a B matrix that characterizes bending and stretching of the respective ply when material properties of the respective ply are asymmetrical about its mid-plane;
identifying a virtual material model of one or more plies of the tangible composite laminate, wherein the virtual material model is associated with characteristics that match the ABD matrix form representations of the one or more plies of the tangible composite laminate;
updating the model by replacing the representations of the one or more plies of the tangible composite laminate with the virtual material model; and
conducting structural analysis of the updated model.

16. The computing device of claim 15, wherein conducting structural analysis of the updated model comprises performing finite element analysis of the model with the representations of the one or more plies replaced by the virtual material model.

17. The computing device of claim 15, wherein the operations further comprise:
determining that results from conducting structural analysis of the updated model are within a threshold value of results from conducting structural analysis of the model.

* * * * *